United States Patent [19]
Killian

[11] Patent Number: 6,064,671
[45] Date of Patent: May 16, 2000

[54] MULTI-HOMED END SYSTEM FOR INCREASING COMPUTERS NETWORK BANDWIDTH

[76] Inventor: Michael G. Killian, 31 Beaufort Rd., Jamaica Plains, Mass. 02130

[21] Appl. No.: 08/569,719

[22] Filed: Dec. 8, 1995

[51] Int. Cl.$^7$ .................................................... H04J 3/26
[52] U.S. Cl. .......................................... 370/389; 370/392
[58] Field of Search .................................... 370/389, 392, 370/352, 485, 404, 458, 401, 410, 403, 402, 474, 475, 524, 227, 228, 235–238; 379/100, 201, 90, 93, 94, 202, 90.01, 93.01, 93.06, 93.09, 93.21; 395/200.68, 200.74, 200.15; 340/825.47

[56] References Cited

U.S. PATENT DOCUMENTS

| | | | |
|---|---|---|---|
| 4,451,827 | 5/1984 | Kahn et al. | 340/825.52 |
| 4,975,906 | 12/1990 | Takiyasu | 370/401 |
| 5,027,350 | 6/1991 | Marshall | 370/401 |
| 5,060,228 | 10/1991 | Tsutsui et al. | 370/402 |
| 5,086,426 | 2/1992 | Tsukakoshi et al. | 370/405 |
| 5,095,480 | 3/1992 | Fenner | 370/238 |
| 5,111,453 | 5/1992 | Morrow | 370/401 |
| 5,136,580 | 8/1992 | Videlock et al. | 370/403 |
| 5,151,897 | 9/1992 | Suzuki | 370/401 |
| 5,166,931 | 11/1992 | Riddle | 370/401 |
| 5,282,270 | 1/1994 | Oppenheimer et al. | 395/200.11 |
| 5,293,488 | 3/1994 | Riley et al. | 395/200.16 |
| 5,319,644 | 6/1994 | Liang | 370/452 |
| 5,331,635 | 7/1994 | Ota | 370/401 |
| 5,347,633 | 9/1994 | Ashfield et al. | 395/200.15 |
| 5,386,413 | 1/1995 | McAuley et al. | 370/392 |
| 5,388,213 | 2/1995 | Oppenheimer et al. | 395/200.16 |
| 5,400,326 | 3/1995 | Smith | 370/401 |
| 5,423,002 | 6/1995 | Hart | 395/200.79 |
| 5,434,863 | 7/1995 | Onishi et al. | 370/402 |
| 5,446,736 | 8/1995 | Gleeson et al. | 370/473 |
| 5,463,735 | 10/1995 | Pascucci et al. | 395/200.1 |
| 5,481,673 | 1/1996 | Michelson | 395/200.15 |
| 5,485,458 | 1/1996 | Oprescu et al. | 370/409 |
| 5,485,460 | 1/1996 | Schrier et al. | 370/389 |
| 5,488,608 | 1/1996 | Flammer | 370/400 |
| 5,535,338 | 7/1996 | Krause et al. | 395/200.2 |
| 5,572,533 | 11/1996 | Sunada et al. | 371/20.1 |
| 5,590,285 | 12/1996 | Krause et al. | 395/200.2 |
| 5,751,971 | 5/1998 | Dobbins et al. | 395/200.68 |

OTHER PUBLICATIONS

RFC814, "Name, Addresses, Ports, and Routes", by David Clark, Jul., 1982, pp. 5–12.
RFC1122, "Requirements for Internet Host—Communication Layers", Network Working Group of the Internet Engineering Task Force, R. Braden, Editor, Oct. 1989, pp. 47–56–60–64, and 103.
Declaration Of Michael G. Killian Regarding Prior Art, Dec. 8, 1996.

*Primary Examiner*—Melvin Marcelo
*Attorney, Agent, or Firm*—Edward W. Porter

[57] ABSTRACT

Network computers have a plurality of network-level interfaces associated with overlapping portions of the network-level address space, such as those represented by multiple static entries with the same address range, or multiple default entries in a network-level routing table. The computers distribute outgoing messages address to the overlapping portions of the address space between the multiple network interfaces associated with those overlapping portions. In the TCP/IP environment, the distribution of messages can be performed on the basis of the outgoing message's source port, the amount of traffic associated with a TCP/IP service indicated by the message's destination port, or by the relative amount of traffic going though each of the respective network interfaces. In some embodiments, the computers are multi-homed end systems which pick the source address of outgoing messages and their associated socket. In some embodiments, the network interfaces between which messages are distributed are dial-up modems having network-level addresses dynamically allocated to them by the computer to which they are connected. Some systems can automatically connect or disconnect such dial-up connections in response to changes communications demands. In some embodiments of the invention, a multi-homed end system distributes messages addressed to a given destination address between multiple network interfaces for the purpose of load testing.

41 Claims, 14 Drawing Sheets

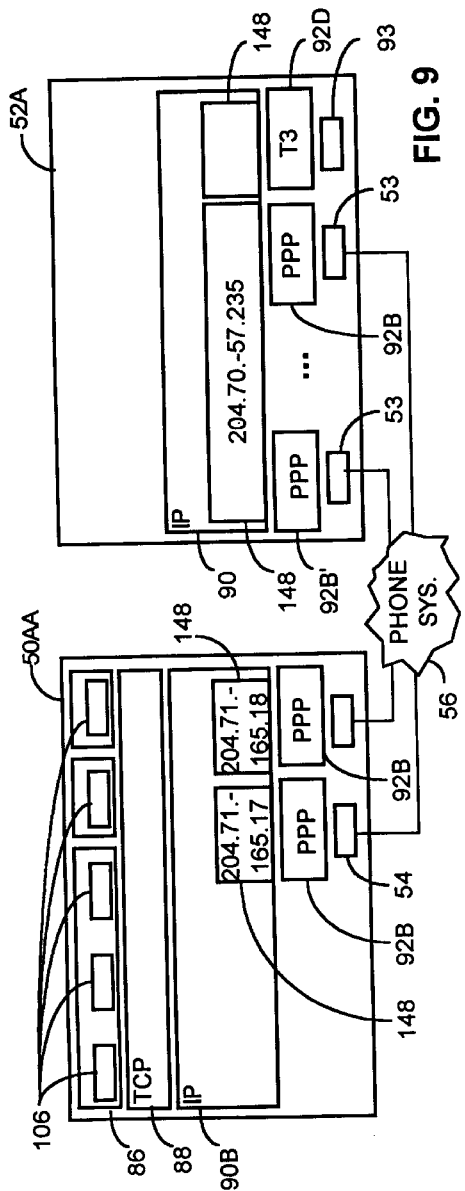

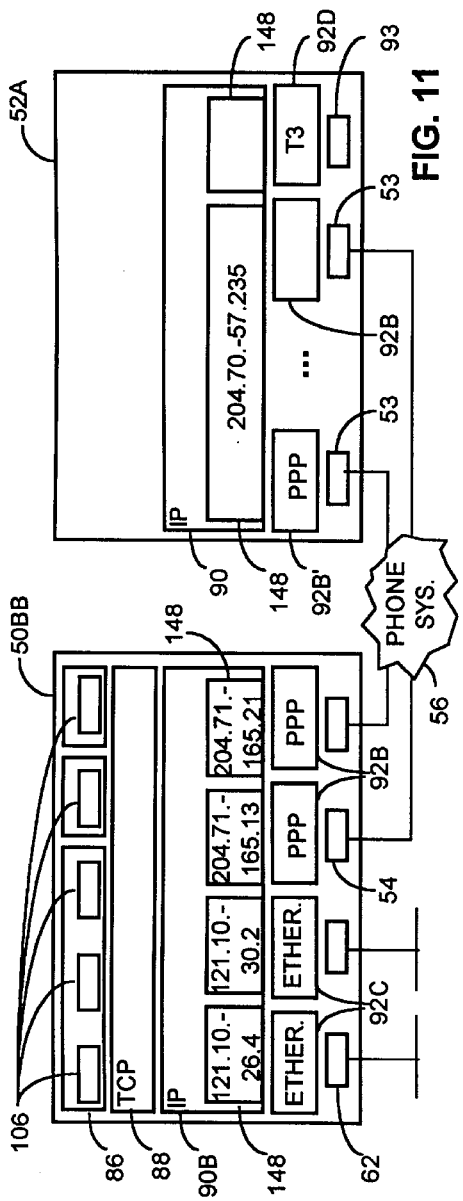

-OUTGOING_MSG_PROCESS~152
    -IF NO SOCKET IN ACTIVE_SOCKET_ARRAY HAS MESSAGE'S SOURCE PORT, DESTINATION PORT, AND DISTINATION ADDRESS~154
        -CLEAR MATCHING_INTERFACE_ARRAY~168
        -SCAN THE ROUTING TABLE TO DETERMINE WHICH ENTRIES CORRESPOND TO THE DESTINATION ADDRESS OF THE CURRENT MSG~169
        -IF HAVE ANY ACTIVE STATIC ENTRIES FOR DESTINATION ADDRESS~170
            -FOR EACH MATCHING STATIC ENTRY~172
                -COPY STATIC ENTRY'S GATEWAY COLUMN IP ADDRESS INTO AN ENTRY IN MATCHING_INTERFACE_ARRAY~174
        -ELSE IF ANY DEFAULTS~176
            -FOR EACH DEFAULT ENTRY~178
                -COPY THE DEFAULT ENTRY'S CORRESPONDING SOURCE NETWORK IP ADDRESS INTO A CORRESPONDING ENTRY IN MATCHING_INTERFACE_ARRAY~180
        -FOR EACH ENTRY IN MATCHING_INTERFACE_ARRAY~182
            -IF ITS IP ADDRESS DOES NOT HAVE ANY ENTRY IN ACTIVE_INTERFACE_ARRAY, CREATE ONE~184
        -IF THERE IS ONLY ONE ENTRY IN MATCHING_INTERFACE_ARRAY~186
            -GIVE DATAGRAM THE IP ADDRESS OF THAT ENTRY~188
        -ELSE IF IN ROUND_ROBIN_MODE~190
            -GIVE MESSAGE THE SOURCE IP ADDRESS OF MATCING_INTERFACE_ARRAY ENTRY HAVING AN ARRAY INDEX EQUAL MODULO(SOURCE PORT NUMBER, NUMBER OF ENTRIES IN MATCHING_INTERFACE_ARRAY)~191
        -ELSE IF IN LOAD_SHARING_MODE~192
            -GIVE MESSAGE THE SOURCE IP ADDRESS OF MATCHING_INTERFACE_ARRAY ENTRY WHOSE CORRESPONDING ACTIVE_INTERFACE_ARRAY ENTRY HAS THE LOWEST SHORT_TRAFFIC_RATE~194
        -ELSE IF IN SERVICE_SHARING_MODE~196
            -GIVE MESSAGE THE SOURCE IP ADDRESS OF THE MATCHING_INTERFACE_ARRAY ENTRY WHOSE CORRESPONDING ACTIVE_INTERFACE_ARRAY ENTRY HAS THE LOWEST WEIGHTED_SERVICES_TOTAL~197
            -READ MESSAGE'S DESTINATION PORT~198
            -ADD THE COMMUNICATIONS WEIGHT ASSOCIATED WITH THAT DESTINATION PORT TO THAT LOWEST WEIGHTED_SERVICES_TOTAL~200
            -ADD THE COMMUNICATIONS WEIGHT ASSOCIATED WITH THAT DESTINATION PORT TO THAT LOWEST WEIGHTED_SERVICES_TOTAL~200
        -CREATE ENTRY FOR MESSAGE'S SOCKET IN THE ACTIVE_SOCKET_ARRAY~202
    -PLACE IP HEADER ON MSG WITH THE SOURCE AND DESTINATION IP ADDRESSES OF MSG'S CORRESPONDING SOCKET'S IN THE ACTIVE_SOCKET_ARRAY~208
    -ADD BIT LENGTH OF MESSAGE TO CURRENT SECONDS_TRAFFIC_COUNT OF ACTIVE_INTERFACE_ARRAY ENTRY WITH MESSAGE'S SOURCE IP ADDRESS~209
    -UPDATE LAST_USE_TIME IN ACTIVE_SOCKET_ARRAY~210
    -DIRECT MSG OUT NETWORK INTERFACE ASSOCIATED WITH ITS SOURCE IP ADDRESS~212
    -RETURN~214

-FIG. 14

-ACTIVE_SOCKET_ARRAY~156
    -AN ENTRY FOR EACH ACTIVE SOCKET CONTAINING
        -SOURCE_PORT~158
        -SOURCE_IP_ADDRESS~160
        -DESTINATION_PORT~162
        -DESTINATION_IP_ADDRESS~164
        -LAST_USED_TIME~166

-FIG. 15

-MATCHING_INTERACE_ARRAY~216
    -AN ENTRY FOR EACH NETWORK INTERFACE APPROPRIATE FOR MESSAGE'S DESTINATION IP ADDRESS CONTAINING
        -SOURCE IP ADDRESS~218

-FIG. 16

-ACTIVE_INTERFACE_ARRAY~220
    -AN ENTRY FOR EACH ACTIVE PHYSICAL INTERFACE CONTAINING
        -PHYSICAL_INTERFACE_ID~224
        -INTERFACE_IP_ADDRESS~226
        -SHORT_TERM_TRAFFIC_ARRAY~228
            -AN ENTRY FOR N SECONDS CONTAINING
                -SECONDS_TRAFFIC_COUNT~229
        -MID_TERM_TRAFFIC_ARRAY~230
            -AN ENTRY FOR EACH OF M SHORT_TERM TIME PERIODS
                -ST_PERIOD_TRAFFIC_COUNT~231
        -WEIGHTED_SERVICES_TOTAL~232

-FIG. 17

-INBOUND_MSG_PROCESS~236
    -IF IT DOES NOT CORRESPONDS TO A SOCKET IN ACTIVE_SOCKET_ARRAY, ADD ITS SOCKET TO ACTIVE_SOCKET_ARRAY~240
    -UPDATE LAST USED TIME~242
    -ADD BIT LENGTH OF MESSAGE TO CURRENT SECONDS_TRAFFIC_COUNT OF ACTIVE_INTERFACE_ARRAY ENTRY WITH MESSAGE'S MESSAGES DESTINATION IP ADDRESS~244
    -STRIP IP HEADER OFF MESSAGE AND SEND UP TO TCP LAYER~246
    -RETURN~248

-FIG. 18

-UPDATE_DEAMON~250
    -FOR EACH ENTRY IN THE ACTIVE_SOCKET_ARRAY~251
        -IF TIME TO LAST_USED_TIME FOR A SOCKET IS MORE THAN SOCKET_TIMEOUT_PERIOD~252
            -REMOVE SOCKET ENTRY FROM ACTIVE_SOCKET_ARRAY~253
            -REMOVE WEIGHT ASSOCIATED WITH ITS DESTINATION PORT FROM WEIGHTED_SERVICE_TOTAL IN ACTIVE_INTERFACE_ARRAY CORRESPONDING TO ITS SOURCE IP ADDRESS~254
    -FOR EACH ENTRY IN ACTIVE_INTERFACE_ARRAY~256
        -INCREMENT SECONDS_TRAFFIC_COUNT POINTER WITHIN THE CIRCULAR SHORT_TERM_TRAFFIC_ARRAY~258
        -IF THIS POINTER IS POINTING TO THE FIRST ENTRY IN SHORT_TERM_TRAFFIC_ARRAY~260
            -INCREMENT THE ST_PERIOD_TRAFFIC_COUNT POINTER WITHIN THE CIRCULAR MID_TERM_TRAFFIC_ARRAY~262
            -SET THE CURRENT ST_PERIOD_TRAFFIC_COUNT TO THE TOTAL OF ALL THE SECONDS_TRAFFIC_COUNT ENTRIES WITHIN THE CIRCULAR SHORT_TERM_TRAFFIC_ARRAY~264
        -CLEAR THE CURRENT SECONDS_TRAFFIC_COUNT~266
    -RETURN~268

-FIG. 19

-AUTOCONNECT_DEAMON~270
    -FOR EACH GROUP OF AUTO-CONNECT PHYSICAL INTERFACE~272
        -IF HAVE AN INACTIVE PHYSICAL INTERFACE IN THE GROUP~274
            -IF THE SUM OF ALL MID_TERM_TRAFFIC_ARRAY ENTRIES IN ALL THE GROUP'S ENTRIES IN THE ACTIVE_INTERFACE_ARRAY IS MORE THAN HIGH_THRESHOLD FOR THE GROUP~276
                -CREATE A NEW INSTANCE OF PHYSICAL LAYER SOFTWARE FOR THE PHYSICAL INTERFACE~278
                -CALL AUTOMATIC LOGGON FOR AN INACTIVE PHYSICAL INTERFACE IN THE GROUP~280
        -IF HAVE MORE THAN ONE AUTO-CONNECT PHYSICAL INTERFACE ACTIVE IN THE GROUP~282
            -IF THE SUM OF ALL MID_TERM_TRAFFIC_ARRAY ENTRIES IN ALL THE GROUP'S ENTRIES IN THE ACTIVE_INTERFACE_ARRAY IS LESS THAN LOW_THRESHOLD FOR THE GROUP~284
                -TAKE THE ENTRIES OFF THE ROUTING TABLE CORRESPONDING TO GROUP'S ENTRY IN ACTIVE_INTERFACE_ARRAY WITH LOWEST SUM IN ITS MID_TERM_TRAFIC_ARRAY~286
                -IF ANY ENTRY IN ACTIVE_INTERFACE_ARRAY HAS NO CORRESPONDING SOCKETS IN ACTIVE_SOCKET_ARRAY, CALL AUTO LOGOFF FOR ITS PHYSICAL DEVICE~288
    -RETURN~290

-FIG. 20

-AUTO_LOGON~292
- -DIAL SPECIFIED NUMBER~294
- -WHEN GET CONNECT PERFORM HANDSHAKING TO CREATE PPP CONNECTION, INCLUDING GETTING IP ADDRESS OF OTHER SIDE OF CONNECTION AND DYNAMICALLY ASSIGNED IP ADDRESS OF OWN NETWORK INTERFACE~296
- -LOGON~298
- -CALL ROUTE_ADD TO ADD ENTRY FOR DEFAULT, MAPPING DEFAULT INTO IP ADDRESS OF OTHER END OF PPP CONNECTION TO ROUTING TABLE~300
- -CALL ROUTE_ADD TO ADD ENTRY MAPPING IP ADDRESS OF OTHER END OF PPP CONNECTION TO THE IP ADDRESS DYNAMICALLY ASSIGNED BY PPP FOR PHYSICAL DEVICE~302
- -RETURN~304

-FIG. $21_1$

-AUTO_LOGOFF~306
- -LOG OFF~308
- -DISCONNECT~310
- -RETURN~314

-FIG. 22

-LOAD_TEST~316
- -QUERY USER FOR IP NAME OR ADDRESS OF SYSTEM TO BE TESTED, THE NAME OF FTP FILE TO BE DOWNLOADED, AND NUMBER OF DOWNLOADS DESIRED~318
- -SET IP LAYER TO ROUND ROBIN MODE~320
- -TURN OFF AUTO-CONNECT~321
- -CREATE A PPP INSTANCE FOR, AND CALL AUTO_LOGON FOR, ALL THE LOAD-TESTER'S MODEMS UP TO THE NUMBER OF DOWNLOADS DESIRED~322
- -START EACH FTP WITH A SOCKET FOR EACH~324
- -CREATE OUTPUT FOR USER INDICATING DATA RATE ON EACH LINE AND OVERALL~328
- -RETURN~330

-FIG. 23

-PBX_CODE~352
- -...
- -IF NEW VOICE CALL IS ATTEMPTING TO GO OUT~354
  - -IF THERE IS NO AVAILABLE OUTSIDE LINE~356
    - -IF IN AUTO_MODEM_DISCONNECT_MODE~358
      - -IF THE NUMBER OF OUTSIDE LINES BEING USED BY MODEMS IS ABOVE MIN_MODEM_LINES, DISCONNECT A MODEM FROM THE OUTSIDE LINE AND USE IT FOR VOICE CALL~360
- -...

-FIG. 25

MULTI-HOMED END SYSTEM FOR INCREASING COMPUTERS NETWORK BANDWIDTH

FIELD OF THE INVENTION

The present invention relates to computer networks, and, more particularly, to apparatuses and methods for increasing the communications bandwidth between individual computers on such a computer network with the rest of the network.

BACKGROUND OF THE INVENTION

As the computer revolution advances, computer networking has become increasingly important. In recent years the number of computers which are connected to computer networks has increased rapidly. Not only are computers being connected to local networks, which might exist in a given building or group of buildings, but also wide area networks, which commonly connect local area networks in widely separated locations, such as the different facilities of a large corporation. In fact, within the last several years it has become increasingly common for computers to be hooked up to a global network formed of a large number of sub-networks called the Internet. As a constantly higher percent of computers are connected to this one large network of networks, it will become increasingly possible for almost any computer to electronically communicate with almost any other computer, no matter where those two computers are located in the world.

FIG. 1 illustrates some prior art computer networks, including a local area inter-network 64. FIG. 1 also schematically represents the Internet 58, which is a global inter-network, and a second local network include to relatively high speed asynchonous tranfer mode or ATM networks 66D and 66E.

The nodes of the networks shown in FIG. 1 include end systems 50 and routers 52. End systems are computers which send and receive messages, but which are not intended to route messages originated on other computers. Routers usually do not originate messages, other than those necessary to support their routing function. Since routers are normally special purpose machines dedicated to the sole function of routing, it is uncommon for a computer to be both a router and an end system.

Each router is designed to be connected to multiple different individual physical networks, such as the physical networks 66A, 66B, and 66C shown in FIG. 1. They route message between the individual physical networks they connect. This is called inter-networking. A group of routers using a common network protocol enable a group of individual physical networks which they connect to operate as a single logical network, or inter-network.

A router's major function is to route messages which are sent to it. This routing uses two addressing schemes, the hardware dependent physical addresses on the individual physical networks directly connected to it, and the hardware independent network-level addresses which represent addresses in the logical network. Network-level addressing provides an inter-network wide addressing scheme. It allows inter-networking between individual physical networks whose individual addressing scheme cannot handle addresses outside their individual networks. It also allows inter-networking between physical networks using different addressing schemes.

A router performs routing by reading the network-level destination address of a message sent to it. It determines if that network-level address corresponds to a system on one of the individual physical networks connected to the router. If so, the router sends the message out on that physical network, containing not only the end system's network-level destination address, but also usually its physical-level address, so the hardware on the addressed system will know the message is for it.

If a message received by the router has a network-level destination address not corresponding to any system on one of the physical networks connected to the router, the router sends the message out to another router on one of its connected physical networks, normally the one it thinks is closest to the message's network-level destination address. Usually this message is sent out with the message's original network-level destination address and the physical address of the router to which the message is being sent for further routing. This process of routing is normally repeated until the message completes its journey from the end system that originated it to the end system specified in its original network-level destination address.

In FIG. 1 the end system 50A is connected through a dial-up modem 54, and telephone network 56, to the modem 53 of a an Internet provider router 52A, which is connected to, and thus part of, the Internet 58. This enables the end system 50A to send and receive messages to and from any other end system 50 connected to the Internet 58, such as end system 50C in FIG. 1. Internet provider routers normally have multiple modems 53 through each of which they can send and receive data from a separate end system. They provide Internet access to end systems which have no permanent Internet connection or address. Such Internet provider routers normally are connected to one or more other routers in the Internet with a high speed digital line 60.

The end system 50B, shown in FIG. 1, is a so-called multi-homed end system because it has more than one network level address (or home) on the inter-network. Like the end system 50A it is also shown connected through a dial-up modem 54, to a modem 53 of the Internet provider router 52A, which effectively connects it to the Internet. But the end system 50B is also shown connected through an ethernet hardware interface 62 to a local inter-network 64, such as that which might exist in an office. As shown, in FIG. 1, this local inter-network includes three individual physical ethernet networks, 66A, 66B, and 66C, which are connected by two ethernet routers 52B and 52C. When the end system 50B sends out a message, its network protocol software determines if the message is addressed to an end system on the local inter-network 64, in which case it sends it out over its ethernet interface 62. Otherwise it sends the message out over the modem to the Internet provider router 52A, which will attempt to route it toward the end system on the Internet addressed in the message.

For computers to communicate with each other over a computer network they need to share common conventions, called network protocols, so they will be able to understand each other. There are many different network protocols, but currently probably the most rapidly growing protocol is the TCP/IP protocol. This is because it is the protocol which is currently used on the Internet. In fact, the "IP" in TCP/IP stands for "Internet protocol".

TCP/IP is actually a family of protocols and associated software capabilities. It is well known in the art of computer networking, and is sold in varying form by many different vendors for many different types of computers.

TCP/IP is a layered network protocol, as is indicated in FIG. 2. Because of the complexity of network software it is beneficial to write it in a modular fashion. It is also advantageous to write network software in layers, so that as applications, operating system software, network technology, and network hardware change, only the layers directly involved with the change need to be modified. Such a layered structure of network protocol software is called a protocol stack.

FIG. 2 shows the well known Open System Interconnection Reference Model, or the OSI model, 68 which defines seven layers of software functionality used to perform network communication. The OSI model is important because it provides a common mental model used by many people in the network field. The OSI model's seven layers protocol stack includes an application layer 70, presentation layer 72, session layer 74, transport layer 76, network layer 78, data link layer 80, and physical layer 82.

The application layer 70 is the software whose communications needs are being served by the other six layers of the protocol stack. It is the ultimate generator and receiver of all messages, other than those generated by lower levels for the purpose of supporting the communication by the application layer. The application layer includes applications, such as e-mail, file transfer, or any other end user application which uses network communications.

The presentation layer 72 performs the task of converting data between the particular format used by a given application in the application layer and the uniform format used by the lower levels of the protocol stack.

The session layer 74 coordinates communication between different applications by keeping track of the transmission and receipt of data between them.

The transport layer 76 establishes, maintains, and terminates communication between two machines, verifying that data sent is correctly received, and, if it is not correctly received, causing it to be resent.

The network layer 78 provides most of the function of routing messages between machines on an inter-network, described above. This is particularly important on huge networks, such as the Internet, where the source end system often does not know where the destination end system is located, where no one system knows the entire topology of the network, and where the network is constantly being change by the addition and subtraction of new routers, sub-networks, and end systems.

The data link layer controls the physical layer, correcting transmission error caused by the physical layer and its associated physical transmission hardware.

Finally, the physical layer is the software which deals with the actual mechanical and electronic receipt of data on a given physical network.

FIG. 2 shows how the TCP/IP protocol stack 84 corresponds to the seven layer OSI model. The TCP/IP stack has only four layers, an application layer 86, a transport layer 88, an Internet layer 90, and a network interface physical layer 92.

The TCP/IP application layer 86 corresponds to the OSI model application, presentation, and session layers. That means applications designed to run on the TCP/IP stack should perform all the functions associated with those top three OSI model layers.

The TCP/IP transport layer 88 corresponds to the transport layer 76 of the OSI model. Two different transport layer protocols are commonly used in TCP/IP stacks, TCP, or transmission control protocol, 88A, and UDP, or user datagram protocol 88B. TCP provides a more complicated, but more reliable, type of communication between two end systems. In TCP each process of communication between a computational entity on one end system and a computational entity on a remote end system is represented as a connection, which has associated data structures in the TCP layers of both of those end systems dedicated to keeping track of that communication process, for verifying that it takes place as intended, and for re-transmitting if it does not. UDP is a more simple, but less reliable, communication scheme which merely sends data to a destination machine without any confirmation that, or of how, it is received.

The Internet layer 90 of the TCP/IP protocol stack is normally comprised of the Internet protocol and the Internet control message protocol, indicated by the "IP" and "ICMP", respectively, in FIG. 2. The Internet protocol does the actual routing of messages. It includes a routing table 94, which contains routing information used by the IP layer to route individual outgoing messages received from TCP or UDP, based on the destination address associated with that message. ICMP is part of the Internet protocol which communicates between IP software running on different machines to report errors, such as time-outs or problems with delivery.

The network interface physical layer 92 of the TCP/IP stack performs the functions of both the data link and physical layers 80 and 82 of the OSI model. It contains the software which is specific to a given type of physical network, such as ethernet, Asynchronous Transfer Mode (ATM), or the Point to Point Protocol (PPP) used with dial-up modems.

TCP/IP protocol stacks normally come with a family of related software applications which run in the application layer 86. These include applications 86C shown in FIG. 2 which use TCP's more reliable communications services. Among such TCP-using applications are Telnet, which enables an end system to operate as a terminal for a different, remote end system; File Transfer Protocol (FTP), which lets an end system send or receive files to or from a remote end system; and Simple Mail Transfer Protocol, which performs e-mail functions.

The application layer programs 86D shown in FIG. 2 use UDP's less reliable, but more efficient services. They include Domain Name System (DNS), which automatically searches the net to obtain the information necessary to convert from a text-based Internet address name, of the type used in business cards or in advertised World Wide Web URLs, to a thirty-two bit binary number representing the actual Internet address; and Network File System, which lets a first end system access files located on a second, remote, end system almost as if they were located on the first system's hard drive.

In addition to the standard TCP/IP applications, which use either TCP or UDP communication services, other applications 86A or 86B, written either by users, their companies, or software vendors can use the TCP/IP stack directly, or through standard TCP/IP application level utilities. For example, World Wide Web Browsers do most, if not all, of their Internet communication using the HyperText Transfer Protocol (HTTP). HTTP is an application level software protocol defined for use with TCP.

FIG. 3 shows how transmitted data travels up and down the TCP/IP stack. In the example shown, the TCP protocol is used in the transfer layer and PPP is used in the network interface physical layer. When a block of data 96 is sent from the application layer 86 to the TCP layer 88, the TCP layer responds by sending the block of data preceded by a TCP header 98 to the IP layer.

The TCP header includes a source port field 100 and a destination port field 102. The TCP layer creates a separate source port 104 for each separate computational entity 106 in its associated application layer communicating over the Internet, and the TCP layer communicates with each such computational entity 106 through its associated port 104. Thus, the source port field 100 in the TCP header identifies the individual computational entity on the TCP layers machine which has originated a message being sent down the protocol stack. The destination port field 102 identifies the computational entity in the application layer of the remote machine to which the message is being sent to which the message should be directed by that remote machine's own TCP layer.

The TCP layer associates a "socket" 108 for each process of communications between computational entities in the application layers of two different end systems. Each such "socket" is defined by a source port, a source Internet protocol, or IP, address, a destination port, and a destination IP address, shown as "SP", "SA", "DP", and "DA", respectively, in FIG. 3. The TCP layer maintain a connection table 110 which keeps track of each of its active sockets.

TCP/IP has a defined interface, called the socket interface, through which applications can open and close sockets and write and read data to and from them. A given application can have more than one socket. For example, in HTML, the HyperText Mark-up Language, used to represent pages on the World Wide Web, not only is each web page a separate file, but each object within that page, such as graphic, video, or audio object, is also a separate file. The popular Netscape web browser currently creates a separate socket for each separate file object needed to render a web page, up to a limit of twenty.

When the TCP layer 88 sends a TCP message 96A to the IP layer 90, it also sends other data 112 to the IP layer in conjunction with that message. This other data includes the source IP address 114 (if the TCP layer knows it) and the destination IP address 116 associated with the message's corresponding socket. Each of these IP addresses holds a thirty-two bit number which uniquely identifies a computer on the Internet.

When the IP layer receives an outgoing TCP message 96A and its associated data 112 it creates a corresponding IP message which includes the TCP message preceded by an IP header 118. The IP header includes the message's associated source and destination IP addresses in fields 114A and 116A, respectively. The IP layer sends this IP message 96B to the network interface physical layer, which, in our example, is a PPP layer 92B, the major type of network interface physical layer commonly used by dial-up modems.

When the network interface physical layer receives an IP message it generates a corresponding physical layer message 96C which includes the IP message with a physical layer header, or with both a physical layer header and a trailer, added. PPP adds both a header 120 and a trailer 122. Once the network interface physical layer has produced an output message, that outgoing message is transmitted over its corresponding physical network connection, which in FIG. 3 is a modem 54.

When an incoming message is received at the bottom of the stack from the physical network, it passes up the stack in the reverse order to that just described, with the headers and, if any, trailers associated with each layer being stripped off before it is handed to the layer above. Once the incoming message gets to the TCP layer, the TCP layer strips off the TCP header and delivers the message through the port indicated in the TCP header to the port's associated computational entity in the application layer.

As shown in FIG. 1, TCP/IP end systems include an application layer 86 with one or more computational entities to be serviced by the protocol stack, a TCP layer 88 (which also includes UDP), and IP layer 90, a physical layer 92, such as a PPP layer 92B, an ethernet layer 92C, a T3 layer 92D. The protocol stacks of TCP/IP Routers, on the other hand, normally only include a physical layer 92 and an IP layer 90. This is because routing functions do not require any protocol stack levels higher than the IP layer, which is dedicated to network-level routing.

When a router receives an incoming message from a given one of its physical interfaces, it send the message up through the interface's associated network interface physical layer 92. This layer strips off the message's physical layer header and trailer, if any, and sends the message up to the IP layer 90. The IP layer then decides, based on the destination IP address contained in the message's IP header and on information in the IP level's routing table, to which end system or router the message should be sent. It then sends the message back down to the network interface physical layer 92 associated with the physical network over which the message is to be transmitted. The network interface physical layer then adds a new physical layer header and, in many cases trailer, to the message. This header indicates the physical address of the next hop in the message's routing. Then the message is transmitted out over the selected physical interface.

FIGS. 4 and 5 refer to the end system 50A, of FIG. 1, whose only network connection is through a modem to an Internet provider router 52A. FIG. 4 shows the Internet protocol, or IP, address, 204.71.165.17, associated with the end system and the IP address, 204.70,57.235, associated with the Internet provider router 52A. These Internet address are shown in an octet representation in which each of the four eight-bit bytes of the thirty-two bit IP address actually used TCP/IP software, is represented by its corresponding decimal value separated by a period.

The IP address of the Internet provider router 52A is fixed, since that router has a fixed, high-speed connection link to the rest of the Internet. The IP address of the end system 50A, however, is a dynamically assigned address which is assigned to the end system 50A by the cooperation of the PPP protocol layer 92B on that end system and the PPP protocol layer 92B' on the Internet provider router 52A. This address is dynamically assigned in the initial handshaking which takes place between the two system's modems when a dial-up connection is first made between them. This address is dynamically allocated both to prevent the wasting of IP addresses, since most machines which use modems to connect to the Internet are only connected to it a small fraction of the time, and because the same modem may connect to the Internet through different Internet provider routers at different times. Since, Internet addresses are normally somewhat hierarchical, dynamic assignment makes it possible for the temporary IP address allocated to an end system's modem to be hierarchically related to that of the router to which it is directly connected. This allows the Internet's routers to know that messages addressed to the end system's IP address should be routed through the router to which it is directly connected.

FIG. 5 shows the routing table 94A contained in the IP layer of the end system 50A when it is connected as in FIG. 4. The routing table can be used to perform several functions in TCP/IP systems. The first is first-hop routing, that is, the designation of to which machine located on an individual physical network connected to the current system a given IP message should be directed by the physical layer. The second is the selection of which soure IP address should be associated with a given message. This function is particularly necessary in end systems which are "multi-homed", that is, which have more than one physical network interface, each with a separate associated IP address. The end system 50A discussed with regard to FIGS. 4 and 5 is not multi-home, but the end system 50B discussed below with regard to FIGS. 6 and 7 is.

TCP/IP routing tables include an entry for each of one or more destination address specifications included in the destination column 126. Each such destination address specification can be a unique IP address, a range of IP addresses, or a so-called "default" value.

A range of IP addresses is normally indicated in the destination column by specifying the highest order digits of an Internet address, but leaving the lower order digits unspecified. This can be done in octet representation by placing a non-zero value in each of one or more of the high order octets of a destination address, but zeros in the remaining lowest order octets. When this is done, any destination address matching all of the non-zero highest order octet's digits will match the routing table entry.

A default routing table entry is one to be associated with any messages whose destination address do not match the destination address or address range of any of the other routing table entries. A default value can be represented in octet representation by "0.0.0.0". All routing tables should include a default entry, and they are necessary in the routing table of any system which is to be connected to a network such as the Internet, which might contain machines whose addresses do not correspond to any specific address or address range contained in the destination column of the routing table.

Each routing table entry also includes a Gateway column 128 which gives the next IP address through which the message should be routed to get to its destination IP address. Each entry also includes an interface column 130 which indicates the physical port through which the message should exit the end system to get to, or to go through, the IP address in the Gateway column.

When an end system's PPP layer 92B makes a connection through a modem 54 with the PPP layer 92B' of an Internet provider router 52A, the PPP handshaking used to establish that connection gives the end system's PPP layer the IP address of the Internet provider router and the IP address dynamically assigned to the end system's PPP network interface by the router. Once it has received these IP addresses, the end system's PPP layer calls standard TCP/IP functions to create two routing table entries, a static entry 132 and a default entry 134.

The static entry 132 has the IP address of the Internet provider router to which the end system is being connected in the destination column. In the gateway column this entry has the IP address of the network interface which has been dynamically assigned to the end system's modem. This is done because any message to the IP address of the Internet provider router has to use as a source IP address the dynamically assigned IP address associated with the end system's own modem.

The entry 134 is a default entry. It has a default value, usually 0.0.0.0, in the destination column and the IP address of the Internet provider router in the gateway column.

When the IP layer receives an outgoing message having a destination IP address equal to that of the Internet provider router, it will use the routing table static entry 132 having that destination address. In that case it will send the message out through the PPP network interface associated with the IP address shown in that entry's gateway column, and it will use that gateway address as the message's source IP address.

If the outgoing message's destination IP address does not equal that of the Internet provider router, the default entry 134 will be used instead. This entry has the IP address of the Internet provider router in its gateway column. The IP layer then scans down the routing table a second time, in a manner similar to that described in the paragraph above, to see which IP address should be used as the source IP address for the message.

FIGS. 6 and 7 are similar to FIGS. 4 and 5, except that they illustrate the connections of the multi-homed end system 50B, of FIG. 1, which is connected to the local inter-network 64 through an ethernet connection as well as to the Internet 68 through an Internet provider router 52A. FIG. 6 is similar to FIG. 4, except that the IP address dynamically assigned to the end system 50B differs in the last octet from that assigned by the same Internet provider router to the end system 50A, and except that it shows the fixed IP address associated with the end system 50B's network interface to its local area inter-network 64 shown in FIG. 1.

FIG. 7 shows a routing table 94B which has a static entry 132A and a default entry 134A. These entries are identical to the entries 132 and 134 shown in routing table 94A of FIG. 5, except for the difference in the last octet of the dynamically assigned network interface IP address associated with the end system's modem shown in the gateway column of entry 132A. The table 94B also differs from the table 94A shown in FIG. 5 by its inclusion of an additional static entry 136. Static routes are often created by a network system administrator to reflect that administrator's knowledge of the network to which the system containing the routing table is connected.

In the example, the static entry 136 states that all messages having a destination address in the range 121.10.0.0 to 121.10.255.255 should go through the end system's network interface having the IP address 121.10.26.4. This is the fixed IP address associated with the network interface of the end system 50B's ethernet connection. In the example, this value has been assigned to the routing table entry associated with the end system's ethernet connection because that is the address range associated with the local area network 64 to which that ethernet connection leads.

TCP/IP systems function amazingly well, particularly considering many of their aspects were designed long before many of their innovators envisioned that computer networks would ever grow to the size and complexity of the current Internet. But as inter-network usage evolves, there is an increasing trend for the number and size of data objects accessed over inter-networks to increase. This is particularly true with regard to Internet usage involving the World Wide Web, where graphical, audio, or video objects have to be frequently accessed to fully enjoy what the Web has to offer.

The problem is that the connections of most end systems to their associated networks do not have a high enough bandwidth to allow users to communicate as quickly as they would like. This is particularly true for users who are connected to the Internet or to other networks through dial-up modems. This is because the current 28.8 kbit data rate of most good modems is too slow to enable satisfactory browsing of the World Wide Web. Even the approximately 128 kbit ISDN communication rates which are expected to become common shortly is not a high enough data rate to properly use the Web. Furthermore, even if a given system has a high bandwidth connection, such as a cable modem or SONET link, to the Internet through a given router, that given router, itself, might not have enough bandwidth to the rest of the Internet to supply all the machines which are attempted to communicate through it with satisfactory communications rates. As a result of such network bottleneck on the other side of the given router, the given system's effective communications bandwidth with the Internet, as a whole, can be much lower than the capacity of its link to the given router.

Such issues of bandwidth are not only of concern in systems designed to use computer networks. They can also be of concern in systems designed to tests various parts of such a network. For example, the prior art has developed systems for load testing, that is, testing how an individual network nodes responds when large amounts of traffic are routed to or through them. To perform such tests it is desirable to be able to generate large amount of traffic addressed toward a given location. Because of the bandwidth limitations of many individual computers which seek to generate such load testing traffic, the prior art has often had to use many computers connected together to generate the high amount of traffic necessary to test how a system will respond to large usage. This is particularly true in the testing of network nodes using dial-up telephone communication.

SUMMARY OF THE INVENTION

It is an object of the present invention to provide apparatuses and methods for increasing the bandwidth at which computers can communicate over computer networks.

It is another object of the present invention to provide apparatuses and methods for increasing the bandwidths at which such computers can communicate over such networks using data links of a given speed.

It is still another object of the present invention to provide apparatuses and methods for increasing the bandwidths at which computers can communicate over networks using dial-up modems.

It is yet another object of the present invention to provide apparatuses and methods for increasing the bandwidths available to a single computer system for the purpose of load testing.

The present invention seeks to accomplish these objects with network computers which have a plurality of network interfaces, and which can spread messages traffic across that plurality of network interfaces in a way not possible in the prior art, so as to increase the total amount of message traffic which such systems can handle.

In a preferred embodiment of the invention, a network node distributes outbound messages between multiple network layer interfaces independent of the highest order digits of the destination address. In some embodiments such distribution is made totally independent of the destination address, allowing, for example, the end system to communicate with a given destination through multiple network interfaces at one time. In some embodiments, the system distributes messages addressed to a given destination address range, such as might be represented by a static entry in a network-level routing table, between multiple network interfaces based on other than the portion of the network address immediately below as defined by the address range. In some embodiments, the system distributes messages whose destination addresses do not match any specific address or address range listed in a routing data structure, such as a network layer routing table, between multiple network interfaces.

In some embodiments of the invention used in individual end systems, the distribution of messages is performed on the basis of the computational process in each such end system with which individual messages are associated. For example, in the case of the TCP/IP protocol, the source port associated with each outgoing message would be used in determining which network interface should be used for the message.

In some embodiments, the distribution can be based, at least in part, on the particular computational process in a destination end system to which the message is addressed. For example, in an embodiment of the invention using the TCP/IP protocol stack, the amount of traffic associated with a TCP/IP service, indicated by a message's destination port number, is taken into account when allocating messages between the source system's multiple network interfaces. This is done in an attempt to make more even the communications traffic over those multiple interfaces.

In some embodiments, outgoing messages are distributed to the network interface which currently appears to be the least busy.

In some embodiments, the network interfaces are associated with dial-up modems. For example, a plurality of PPP network interfaces can be used which receive a dynamically allocated IP address upon making a PPP connection and which automatically create corresponding entries in a network-level routing table. Such embodiments automatically distribute outgoing messages between the PPP network interfaces.

In some embodiments of the invention, the system includes means for automatically creating or activating additional network interfaces in response to changes in network traffic, to or from the system.

In some embodiments of the invention, a multi-homed end system distributes messages addressed to a given destination address between multiple network interfaces for the purpose of load testing.

According to another aspect of the invention, an end system is provided which has means for creating, or activating, an additional network interface based on communications traffic, and for spreading messages between the additional network interface and the previously operating network interface.

DESCRIPTION OF THE DRAWINGS

These and other aspects of the present invention will become more evident upon reading the following description of the preferred embodiment in conjunction with the accompanying drawings, in which:

FIG. 9 is similar to FIG. 4, except that it illustrates the IP addresses associated with the multiple dial-up connections between the modified end system 50AA and router 52A shown in FIG. 8;

FIG. 10 is similar to FIG. 5, except that it illustrates the routing table created in the modified end system 50AA after the multiple connections shown in FIG. 9;

FIG. 11 is similar to FIG. 6, except that it illustrates the IP addresses associated with the multiple dial-up connections between the modified end system 50BB and router 52A and with the multiple ethernet connections between that end system and local network 66A, shown in FIG. 8;

FIG. 12 is similar to FIG. 7, except that it illustrates the routing table created in the modified end system 50BB after the multiple connections shown in FIG. 11;

FIG. 14 illustrates OUTGOING_MSG_PROCESS, a simplified pseudo-code representation of the sub-routine in the IP layer of end system 50BB which processes outgoing messages and distributes them between multiple network interfaces;

FIG. 15 is a simplified representation of the ACTIVE_SOCKET_ARRAY data structure used by the IP layer of system 50BB to keep track of which sockets have been distributed to which network interfaces;

FIG. 16 is a simplified representation of the MATCHING_INTERFACE_ARRAY data structure used by the IP layer of system 50BB to keep track of which one or more network interfaces are appropriate for an outgoing message according to the routing table;

FIG. 17 is a simplified representation of the ACTIVE_INTERFACE_ARRAY data structure used by the IP layer of system 50BB to keep track of the one or more network interfaces which are currently active;

FIG. 18 illustrates INBOUND_MSG_PROCESS, a simplified pseudo-code representation of the sub-routine in the IP layer of end system 50BB which processes incoming messages;

FIG. 19 illustrates UPDATE_DEAMON, a simplified pseudo-code representation of the sub-routine called within the IP layer of end system 50BB approximately once a second to remove inactive socket entries from the ACTIVE_SOCKET_ARRAY and to update the traffic counts associated with each active physical interface;

FIG. 20 illustrates AUTOCONNECT_DEAMON, a simplified pseudo-code representation of the sub-routine called approximately once a minute if the user has selected to have the end system automatically connect or disconnect network connections in response to changes in traffic rates;

FIG. 21$_1$ illustrates AUTO_LOGON, a simplified pseudo-code representation of the sub-routine in the PPP layer of end system 50BB which automatically dials-up, handshakes with, and logs onto, an Internet provider router;

FIG. 22 illustrates AUTO_LOGOFF, a simplified pseudo-code representation of the sub-routine in the PPP layer of end system 50BB which automatically logs off and disconnects from an Internet provider router;

FIG. 23 illustrates LOAD_TEST, a simplified pseudo-code representation of an application level function which can run with a TCP/IP stack like that shown in FIG. 13 to drive a plurality of modems to perform load testing;

FIG. 25 illustrates PBX_CODE, a simplified pseudo-code representation of part of a sub-routine executed within the PBX of FIG. 24 to automatically disconnect a line being used by the end system of FIG. 24 when needed for outgoing voice calls.

DETAILED DESCRIPTION OF PREFERRED EMBODIMENTS

Figure 1:
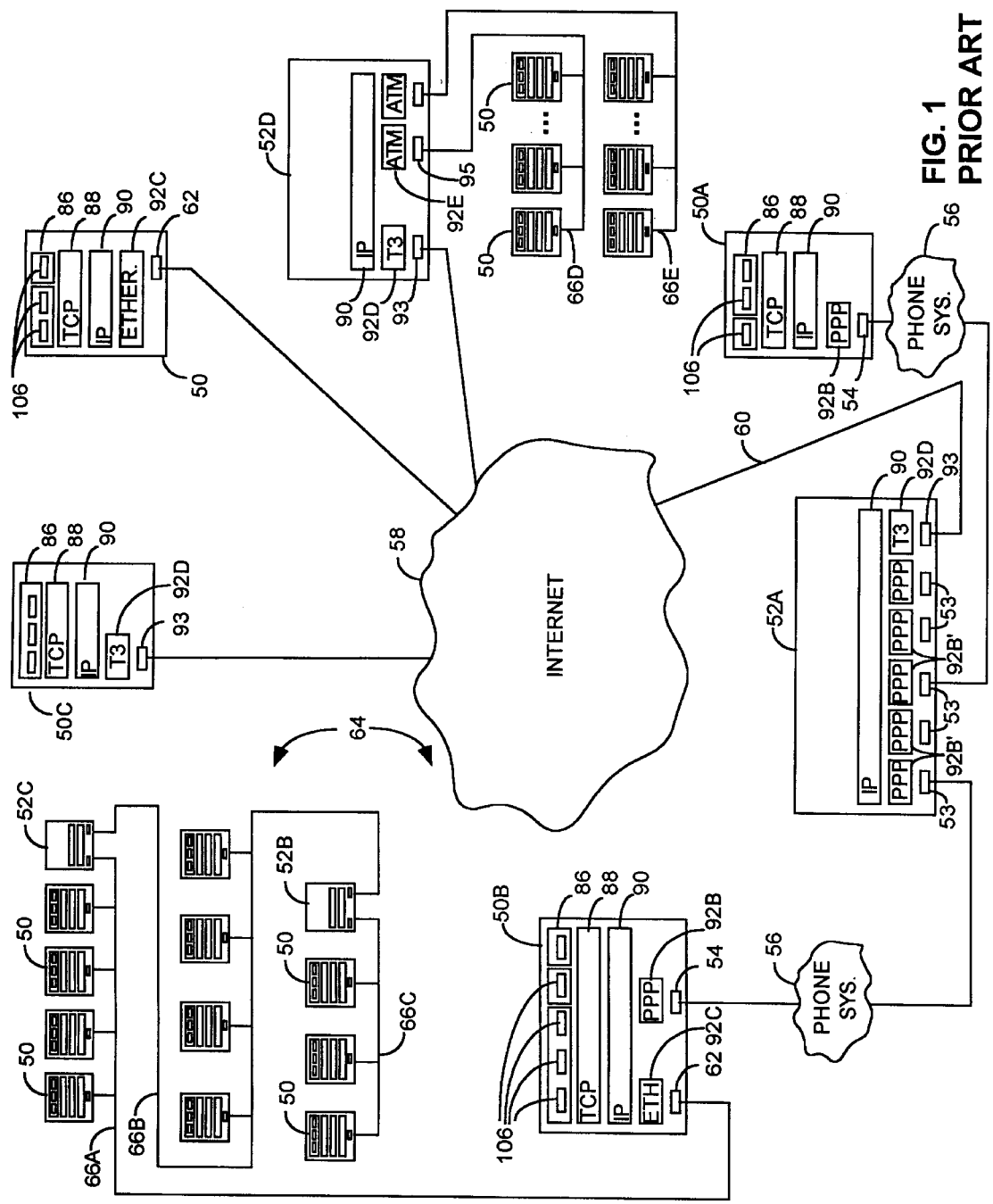
FIG. 1 is a schematic representation of prior art computer networks, showing inter-networking end systems and nodes.
Figure 8:
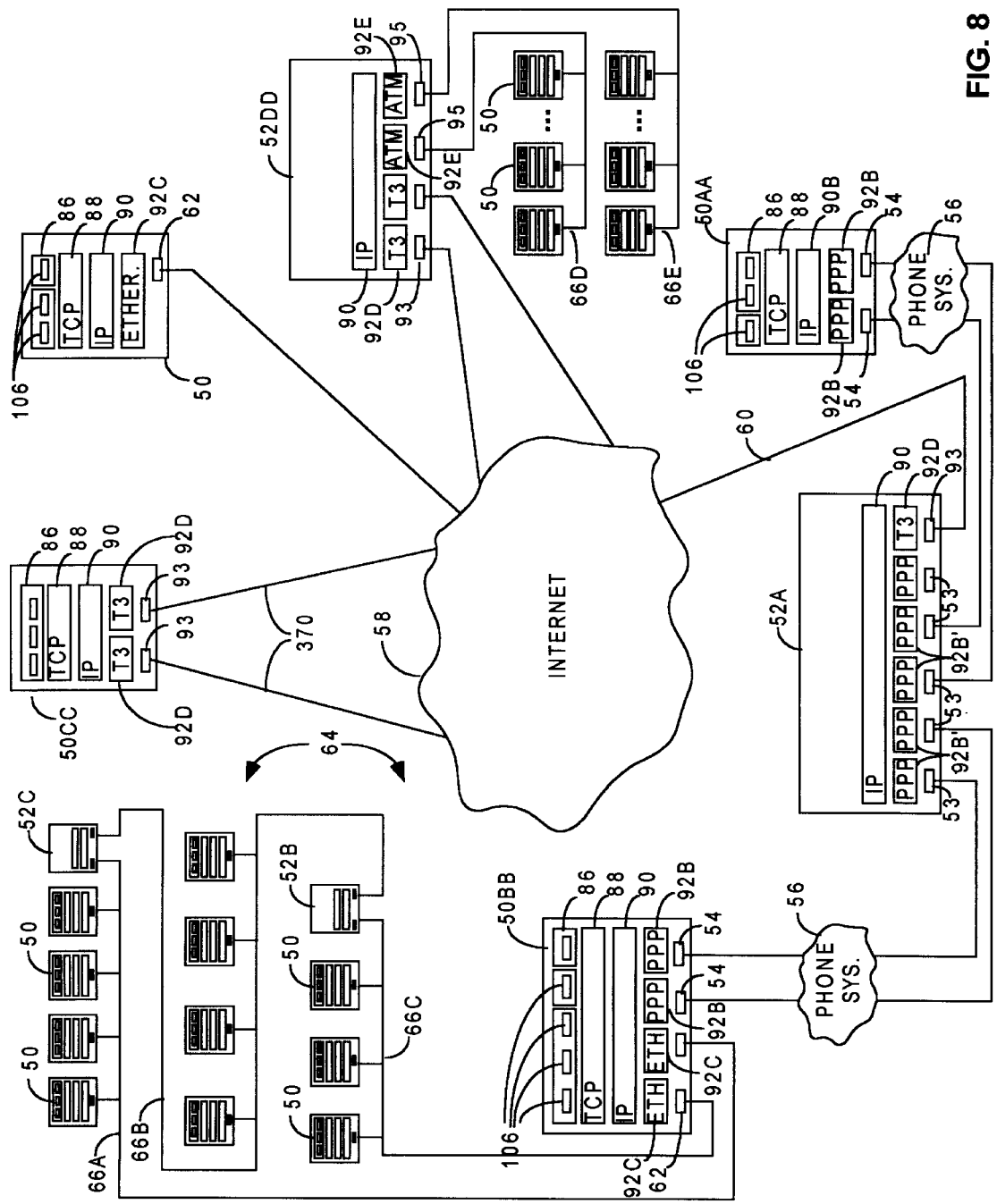
FIG. 8 is a schematic representation of computer networks similar to that in FIG. 1, except that in FIG. 8 certain end systems and routers have been modified according to the present invention to be able to distribute messages over multiple network interfaces in a novel manner, to increase bandwidth.

FIG. 8 shows a system of computer networks which is similar to that shown in FIG. 1, except that in it several of the computers shown in FIG. 1 have been modified to embody the present invention. These include the end systems 50AA, 50BB, and 50CC and router 52DD which correspond, respectively, to the system 50A, 50B, 50C and 52D in FIG. 1. The systems 50AA, 50BB, 50CC and 52DD have all been modified to include multiple network interfaces and means for distributing messages addressed to a given specific destination IP address, destination IP address range, or destination IP address not corresponding to any destination address or address range listed in those systems' respective routing tables between such multiple network interfaces.

The end system 50AA has an application layer 86 and TCP layer 88 which are identical to the corresponding layers in the end system 50A of FIG. 1. Similarly, each of system 50AA's modems 54 and each instance of its PPP layer 92B is identical to the modem 54 and PPP layer 92B of end system 50A. But the end system 50AA of FIG. 8 is different than the end system 50A of FIG. 1 because it had two instances of the PPP layer 92B, two modems 54, and its IP layer 90B not only has a separate network address for each of those modems and its associated PPP layer instance, but also has means for automatically spreading messages between them.

Figures 4, 5:
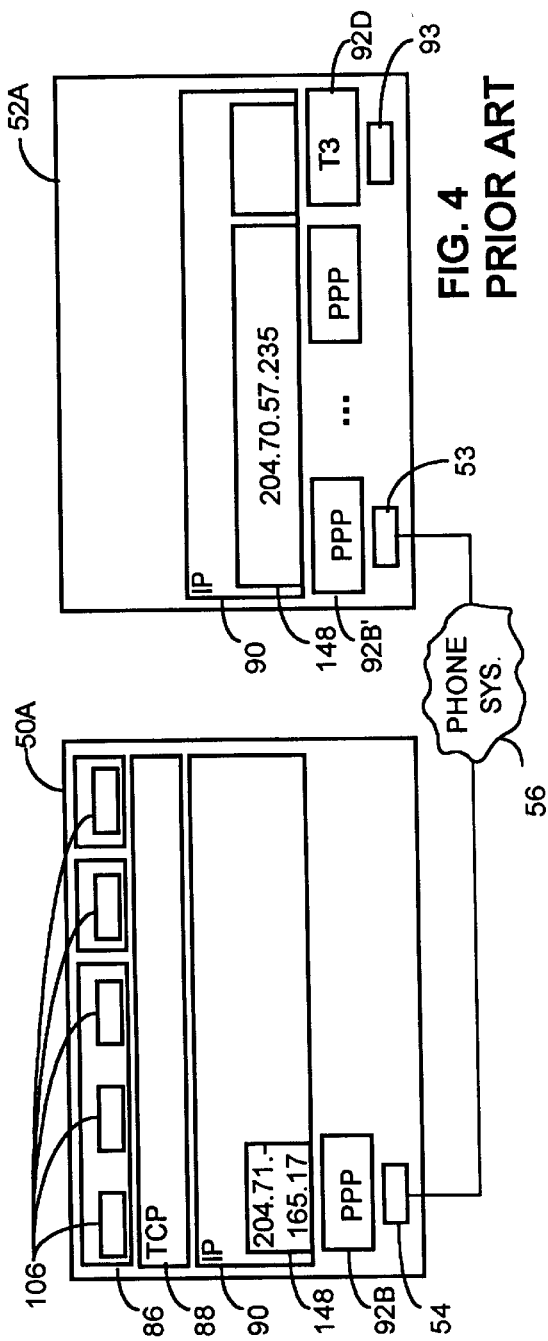
FIG. 4 is a schematic representation of the IP addresses associated by the prior art with the dial-up connection between the end system 50A and router 52A shown in FIG. 1.
FIG. 5 is a schematic representation of routing table created in the end system 50A by the prior art after the connection shown in FIG. 4.

FIGS. 9 and 10 are to the end system 50AA of FIG. 8, what FIGS. 4 and 5 are to the end system 50A of FIG. 1. When each of the modems 54 of the end system 50AA makes a connection with the Internet provider router 52A, the network interface associated with each is dynamically assigned an IP address by the PPP handshaking performed between the PPP layer instance 92B associated with the modem and the PPP layer instance 92B' of the modem 53 being connected to on the Internet provider router. In the example of FIG. 9 the Internet provider router 52A retains the same fixed Internet address it had in FIG. 4. The dynamically allocated address of one of the end system's two modems is the same as in FIG. 4, but the other is different. This is because the PPP layer on the Internet provider router does not know the two modems 54 in FIG. 9 are on the same computer, and because, even if it did, each separate IP layer network interface on a TCP/IP system should have a separate IP address.

FIG. 10 shows the routing table which is automatically created by the separate operation of each of the two PPP layer instances 92B in the end system 50AA of FIGS. 8 and 9. Each of the end system's two PPP layer instances obtains the IP address of the Internet provider router to which it is connected and the IP address dynamically assigned to the instance's own network interface, and, once it has obtained these two IP addresses, places two entries, a static 132 entry and a default 134 entry, in the end system's own routing table.

The static entry has the IP address of the Internet provider router in the destination column 126, the IP address of the PPP instance's own network interface in the gateway column 128, and an identifier of the PPP instance's physical port in the interface column 130. The 134 entry has a default value in the destination column 126, the IP address of the Internet provider router in the gateway column 128, and the physical port of the particular PPP instance making the entry in the interface column 130. In FIG. 10 entries 132B and 134B are associated with the PPP instance using the modem 54 having the physical port designation "du0", and entries 132C and 134C are associated with the PPP instance using the modem 54 having the physical port designation "du1".

The IP layer 90B used in the systems 50AA, 50BB, 50CC and 52BB of FIG. 8 has been modified to distribute messages whose destination IP address matches multiple routing table entries between the network interfaces associated with such multiple entries. For example, if a routing table has multiple defaults, such as is shown in FIG. 10, the IP layer 90B can distribute messages which correspond to no other destination address entry in the routing table between those multiple defaults, so as to effectively create multiple active default network interfaces and, thus, greatly increase the total communication bandwidth with the rest of the network. Similarly, the IP layer can distribute messages whose destination IP addresses match a common destination address or address ranges specified in two or more routing table entries (such as in the two static entries 132B and 132C in FIG. 10) between the network interfaces associated with those two or more entries.

Figures 6, 7:
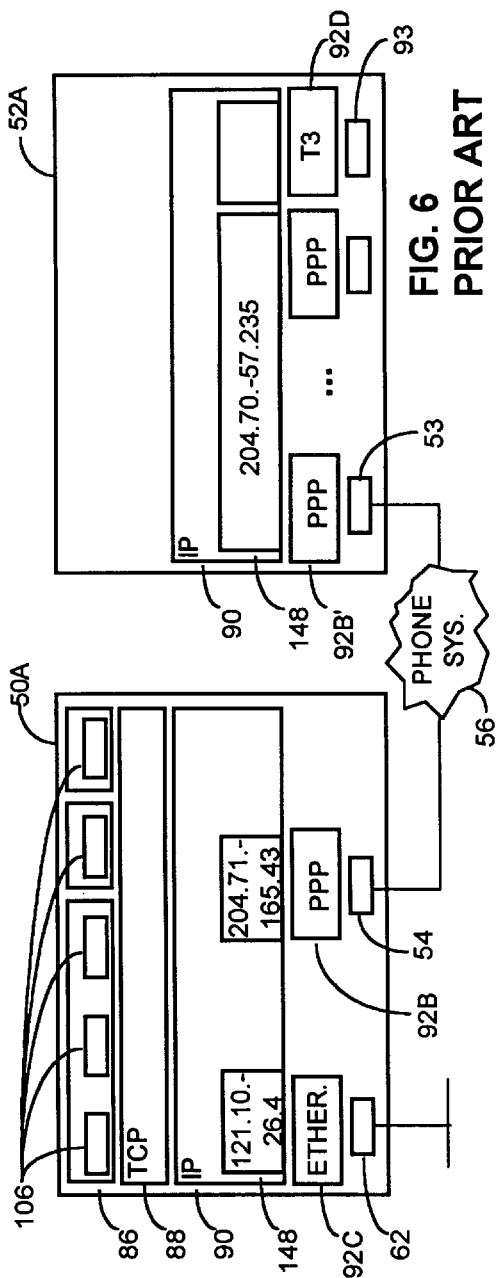
FIG. 6 is a schematic representation of the IP addresses associated by the prior art with the dial-up connection between the end system 50B and router 52A and with the ethernet connection between that end system and a local network 66A, an shown in FIG. 1.
FIG. 7 is a schematic representation of routing table created in the end system 50A by the prior art to reflect the connections shown in FIG. 6.

FIGS. 11 and 12 are to end system 50BB of FIG. 8 what FIGS. 6 and 7 were to end system 50B of FIG. 1. End system 50BB is similar to the system 50B, except that it contains both two PPP-modem connections to the Internet provider router 52A and two ethernet connections to the local area network 64, one to its sub-net 66A and one to its sub-net 66B. The two PPP-modem connections are virtually identical to the two similar connections of the end system 50AA, described with regard to FIGS. 9 and 10, except that the network interfaces on the end system 50BB have been dynamically assigned slightly different IP addresses by the Internet provider router 52A since, in the example, the end system 50AA is connected to that Internet provider router at the same time as system 50BB.

In the example of FIGS. 11 and 12, the PPP layer instance having the physical port identified by "du0" creates static entry 132D and default entry 134D in the routing table 94D shown in FIG. 12. The PPP layer instance having the physical port identified by "du1" creates the static entry 132E and default entry 134E shown in that figure.

Each of the ethernet connections of the end system 50BB has an instance of the ethernet layer 92C which is the same as the single instance of the ethernet layer of the end system 50B. The routing table of FIG. 94D includes two entries 136A and 136B, one for each of the network interfaces associated with each such ethernet layer instance. Each of these entries is similar to the entry 136 described with regard to FIG. 7. Both of the static route entries 136A and 136B have the same address range in the destination column 126, but each has a different address in the destination column 128, and a different physical port identified in the interface column 130.

The present invention enables messages whose destination IP address falls within the destination address ranges specified in both of these static entries to be routed through either of the separate ethernet network interfaces associated with these two entries, almost doubling the communication bandwidth of the end system 50BB with the local area network 64.

Figure 13:
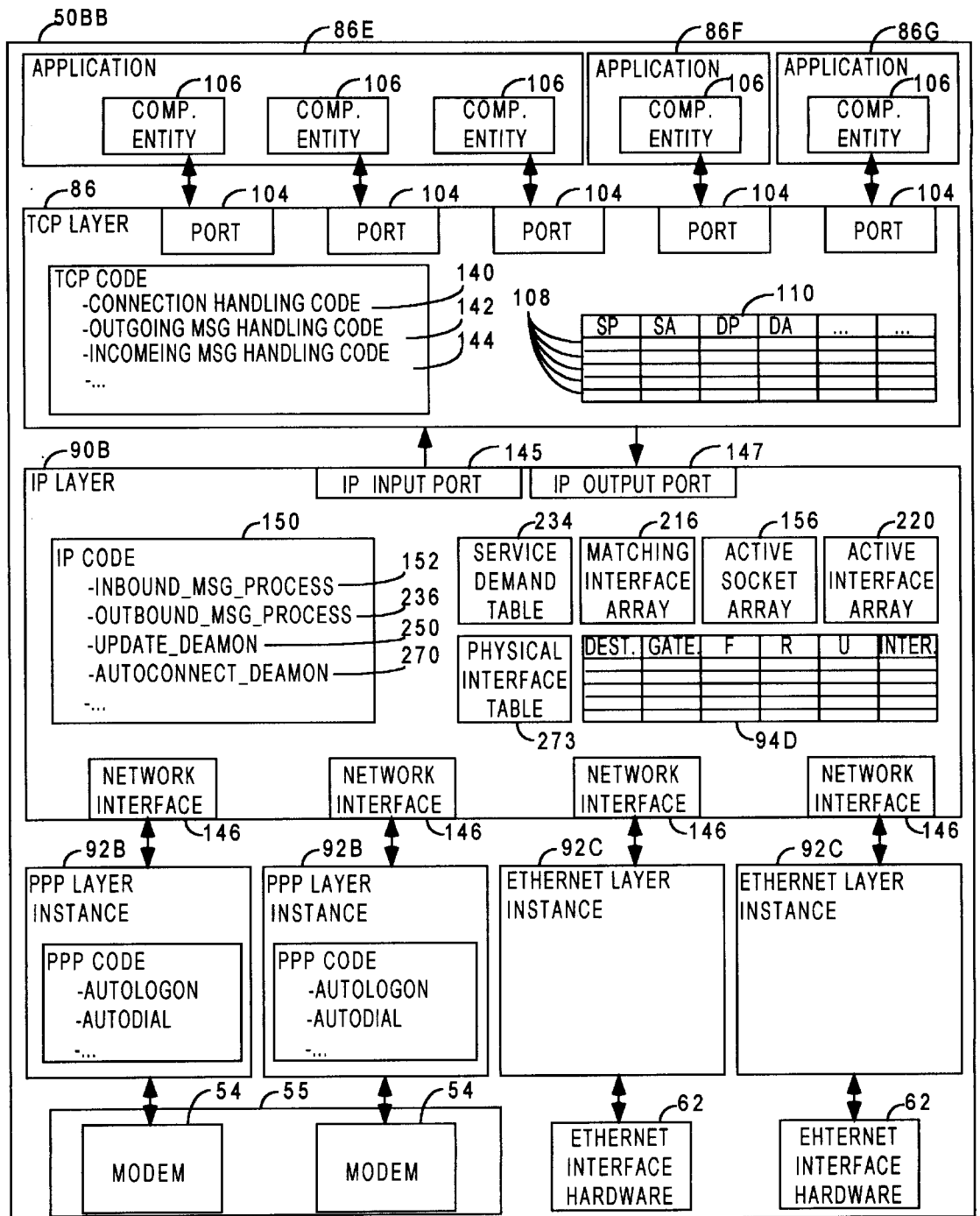
FIG. 13 is a schematic representation of the TCP/IP protocol stack and associated hardware network interfaces of the modified end system 50BB shown in FIG. 8.

FIG. 13 shows the protocol stack and hardware interfaces of the end system 50BB in greater detail.

In most embodiments such an end system is a computer having one or more central processing units (CPUs) for instructions; a random access memory (RAM) for storing instructions and data for ready access by the CPU; a mass storage device, such as a hard disk, for storing instructions and data that are not currently being stored in RAM; as well as other common computer components. The layers 86, 88, 90B, and 92B and 92C of the end system's protocol stack are software entities comprised of computer instructions and data which are stored on hard disk and RAM. When these instructions and data are executed and read and written by the CPU, they perform the functions of the present invention.

The modems 54 and the ethernet hardware interfaces 62 are hardware which can be located, for example, on add-on cards. In the embodiment of the invention shown in FIG. 13, the two modems 54 are located on one add-on card 55, to save card slots and to reduce the combined price of the two modems.

It is preferred that all of the changes to the protocol stack necessary to make TCP/IP embodiments of the present invention be placed in the IP layer. This enables conventional application layers 86, TCP layers 88, and network interface physical layers, such as the PPP and ethernet layers 92B and 92C, respectively, shown in FIG. 13 to be used with the invention, reducing the amount of programming necessary to make the invention operate on different systems.

Figure 2:
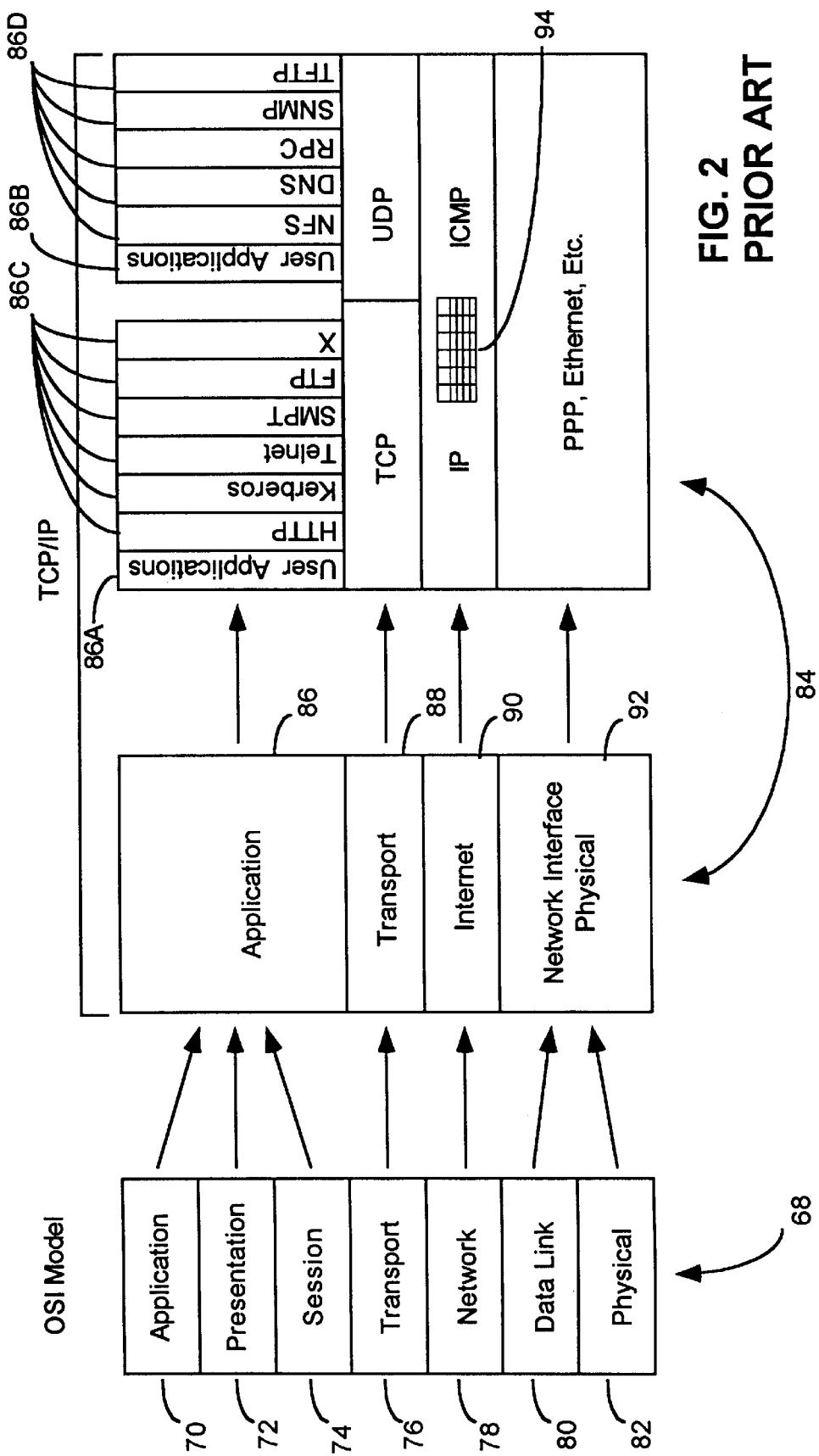
FIG. 2 is a schematic representation of the prior art OSI and TCP/IP models for multi-layered inter-networking protocol stacks.

FIG. 13 shows a plurality of applications 86E, 86F, and 86G currently running in the application layer 86. These can be standard applications, which have no knowledge of the invention, such as standard Web browsers, or the TCP/IP utilities 86C and 86D shown in FIG. 2. These applications can also includes special applications, designed to operate with, or to take advantage of, the novel features of the present invention.

The TCP layer 88 is a standard TCP layer. It includes connection handling code 140 for opening, closing, reading from, and writing to, connections called sockets. Each socket normally represents a connection between an individual computational entry 106 in the application layer 86 of the TCP layer's own end system and an individual computational entity 106 in the application layer of a remote end system, such as the end systems 50CC or 50DD shown in FIG. 8. As described above with regard to FIG. 3, the standard TCP layer stores information on each such socket 108 in a connection table 110, including the source port, source IP address, destination port, and destination IP address of each such connection.

Each socket's source port 104 defines the TCP layers connection to its associated computational entity 106 in the application layer. Some applications open only one socket, so that in effect, the TCP layer treats the entire application as if it were one computational entity 106. But, as was stated above with regard to FIG. 3, some applications, such as the Netscape Web Browser, can open many sockets at one time. As will be described below, the present invention has the ability to spread traffic associated with different socket between different static routes having the same destination address range, or between a plurality of default entries. This can greatly increases the bandwidth with which such multi-socket application layer programs can communicate over the net.

Figure 3:
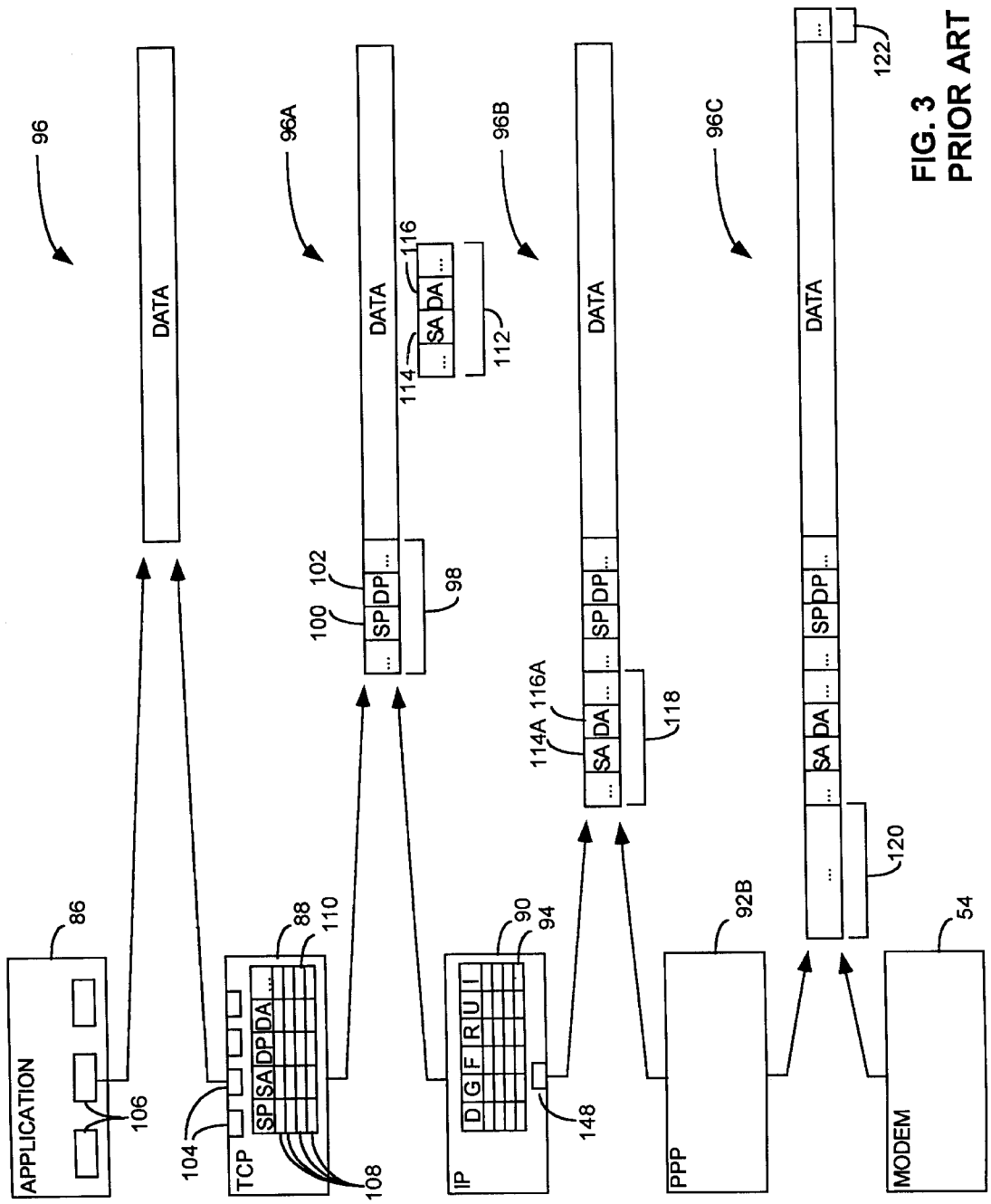
FIG. 3 is a schematic representation of a data message as it passes up and down a prior art TCP/IP protocol stack.

The TCP layer also includes code 142 for handling outgoing messages, by, among other things, generating a similar message with a TCP header 98, as shown in FIG. 3, and sending it to the IP layer for routing. The TCP layer includes code 144 for handling incoming messages received from the IP layer, by stripping off the TCP header and routing the message to the port 104 identified in the destination port field 102 of the TCP header shown in FIG. 3. This causes the message to be delivered to the computational entity in the application layer associated with that port.

Although not shown in FIG. 13, the transport layer 88 of the end system 50BB also includes a UDP layer as well as a TCP layer.

The IP layer 90B of the end system 50BB performs all the standard functions of an IP layer plus more. Like a common IP layer, it includes an IP input port 145 for sending incoming messages to the TCP layer, an IP output port 147 for receiving outgoing messages from the TCP layer, and a routing table (in this case routing table 94D) to tell it how to route outgoing messages. Also like a common IP layer it includes one or more network interfaces 146, each of which consists of an association between a network IP address, on one hand, and, on the other, one of the end system's physical ports and its associated network interface physical layer.

The IP layer 90B's program code 150 include instructions enabling multiple entries to be made in its routing table 94D which have the same values in the destination column, such as, in the example of FIG. 12, the multiple static entries 132D and 132E, which have the same unique destination address; the multiple static entries 136A and 136B, which have the same destination address range; and the multiple default entries 134D and 134E. The IP code 150 also includes instructions and data structures that enable it to distribute outgoing messages whose destination IP address matches multiple routing table entries between the different network interfaces associated with each of those matching entries.

FIG. 14 illustrates OUTGOING_MSG_PROCESS 152, a highly simplified description of the portion of the IP layer code 150 which handles outgoing messages. OUTGOING_MSG_PROCESS is called for each outgoing message received from the TCP layer. It starts with a step 154 which checks if the source port, destination port, and destination address associated with the message for which OUTGOING_MSG_PROCESS has been called has a corresponding entry in the ACTIVE_SOCKET_ARRAY 156, a data structure represented in FIG. 15.

As shown in FIG. 15, the ACTIVE_SOCKET_ARRAY contains a separate entry for each active socket about which the IP layer knows, and each such entry includes the socket's corresponding source port 158, source IP address 160, destination port 162, destination IP address 164, and a variable LAST_USED_TIME, which stores the last time the IP layer has handled either an incoming or outgoing message associated with that socket.

It should be noted that the use of such a socket table or array in the IP layer is unusual. It is because, according to the traditional division of function between the IP layer and higher layers, the IP layer is not supposed to have any knowledge of source and destination ports.

As stated above with regard to FIG. 3, each outgoing message received from the TCP layer designates its source and destination ports in the TCP header 98, and the destination IP address in an auxiliary data structure 112 which the TCP layer sends to the IP layer. It is this information which step 154 uses to determine if the current message's corresponding socket is in the ACTIVE_SOCKET_ARRAY. In the particular embodiment of the invention shown, OUTGOING_MSG_PROCESS ignores the source IP address, if any, which accompanies the current outgoing message, to maintain total control over the allocation of sockets to network interfaces.

Returning to FIG. 14, if step 154 finds no socket corresponding to the current message in the ACTIVE_SOCKET_ARRAY, it causes steps 168–202 to be performed. If the current message already has a socket in the ACTIVE_SOCKET_ARRAY, steps 168–202 are unnecessary, and step 154 advances program execution directly to step 208.

If step 154 causes them to be performed, steps 168–202 select a source port for the current message and its associated socket and add that socket to the ACTIVE_SOCKET_ARRAY.

Step 168 clears a data structure called the MATCHING_INTERFACE_ARRAY 216. As shown in FIG. 16, this is an array designed to hold the source IP address 218 of each of the one or more network interfaces, which the routing table indicates are appropriate for the destination address of the current message.

Next step 169 of OUTGOING_MSG_PROCESS tests to see which one or more entries in the IP layer's routing table 94D have destination column specific addresses or address ranges matching the destination address of the current message.

Then step 170 tests to see if one or more of those matching routing table entries are static entries. If such matching static entries are found, step 172 will cause step 174 to copy the gateway field of each such static entry into the MATCHING_INTERFACE_ARRAY as a potential source address for the current message.

In the example of FIGS. 12 and 13, if the destination address of the current message falls within the range defined in the destination column of the static entries 136A and 136B, the MATCHING_INTERFACE_ARRAY will have two entries, one with the IP address 121.10.26.4 and the other with the IP address of 121.10.30.2. Similarly, in that example, if the current message's destination address is 204.70.57.235, the array will have two entries having the IP address of 204.71,165.21 and 204.71.165.13.

If step 170 finds there are no matching static entries, step 176 tests to see if there are one or more default entries in the routing table. If so, step 178 causes a step 180 to copy each of those default entry's corresponding source network IP address into the MATCHING_INTERFACE_ARRAY. As indicated above in the discussion of FIG. 5, this requires a second scan down the routing table to find a second entry having the same IP address in the destination column as the default entry has in its gateway column. It is the IP address in this second entry's gateway column which can be used as a source IP address for the current message. It is this IP address which is loaded into the MATCHING_INTERFACE_ARRAY by step 180.

In the example shown in FIGS. 12 and 13, unless the destination address of the current message matches the address or address ranges defined by the destination column of routing table static entries 132D, 132E, 136A, or 136B, the default entries 134D and 134E will be appropriate for the message, and the MATCHING_INTERFACE_ARRAY will have two entries, 204.71,165.21 and 204.71.165.13.

Although it is not shown in FIG. 14, it should be understood by those skilled in the TCP/IP arts that if the routing table improperly fails to have a default, and does not have a matching static entry for the current message, an error will be reported.

Once all IP addresses of the one or more network interfaces which the routing table indicates are appropriate for use as a source address by the current message are entered into the MATCHING_INTERFACE_ARRAY, steps 182 and 184 test to see if each such IP address has a corresponding entry in the ACTIVE_INTERFACE_ARRAY 220, and if not step 184 creates one.

As shown in FIG. 17, the ACTIVE_INTERFACE_ARRAY is a data structure which includes an entry for each of the end system's currently active physical network interfaces. This entry include a PHYSICAL_INTERFACE_ID 224, corresponding to the value in the interface column of the routing table entry which has the network interface's IP address in the gateway column; an INTERFACE_IP_ADDRESS 226 corresponding to the network interface's IP address in that gateway column; a SHORT_TERM_TRAFFIC_ARRAY 228 which indicates the amount of traffic through the interface in a relatively short recent period of time, such as ten seconds; a MID_TERM_TRAFFIC_ARRAY 230 which indicates the amount of traffic through the interface over a longer recent period, such as several minutes; and WEIGHTED_SERVICES_TOTAL 232 which is a weighted sum of the sockets associated with the interface, weighted by the amount of traffic normally associated with the type of communication service being provided over the socket. The SHORT_TERM_TRAFFIC_ARRAY is a circular array comprised of N SECONDS_TRAFFIC_COUNT entries 229, one for each of N seconds, which indicates the number of bits to flow through the network interface in that second. The MID_TERM_TRAFFIC_ARRAY also is a circular array. It has M ST_PERIOD_TRAFFIC_COUNT entries 231, each of which indicates the traffic in one of M successive periods of N seconds recorded N seconds apart in the SHORT_TERM_TRAFFIC_ARRAY.

Returning to FIG. 14, the next step of OUTGOING_MSG_PROCESS, step 186, tests to see if there is only one entry in the MATCHING_INTERFACE_ARRAY. If so, step 188 gives the outgoing message the source IP address of that one entry, and causes program execution to skip steps 190–200. If not, step 188 causes steps 190–200 to pick which of the plurality of network interfaces in the MATCHING_INTERFACE_ARRAY should be associated with the message.

The IP layer 90B can operate in either of three modes for distributing messages and their associated sockets between network interfaces which are appropriate for them based on destination IP address: round-robin mode associated with steps 190 and 191, the load-sharing mode associated with steps 192 and 194, and the service-sharing mode associated with steps 196–200.

Although not shown in the figures, in the preferred embodiment, an application layer program is provided which has a graphical user interface allowing the user or a system administrator to pick which of these three modes is to be used by the IP layer. This application program also lets the user set other variable to be used in the invention's message distribution scheme, such whether a specified fixed number of the dial-up modems should be connected or whether such connections after the first should be made and broken automatically based on the amount of message traffic, and the lengths of time associated with each entry in the SHORT_TERM_TRAFFIC_ARRAY and the MID_TERM_TRAFFIC_ARRAY.

Step 190 of OUTGOING_MSG_PROCESS tests to see if the IP layer has been set to operate in the round-robin mode. If so, step 191 will give the current message the source IP address of the entry in the MATCHING_INTERFACE_ARRAY having the index equal to the Modulo of the current message's source port, using the number of entries in the MATCHING_INTERFACE_ARRAY as the divisor. That is, it will assign the message the source IP address of the entry having an index equal to the remainder which results from the integer division of the message's source port number by the number of entries in the MATCHING_INTERFACE_ARRAY. In the example of FIG. 13 where there will always be two entries in MATCHING_INTERFACE_ARRAY, this means that messages with an even source port number will be allocated the IP address in the MATCHING_INTERFACE_ARRAY entry with an index of zero (i.e., the first entry), and messages with an odd source port number will be allocated the IP address with an entry index of one (i.e., the second entry).

The round-robin distribution scheme is the simplest method of allocating messages and their associated sockets between network interfaces. Its distribution of messages by the module of their source port number always allocates all messages associated with a given socket to the same interface. Because of its simplicity, a system using only the round-robin scheme would not require all of the data structures used in the system 50BB, since some of these structures are designed to support the more complicated load-sharing and service-sharing distribution modes.

If the test of step 190 fails, step 192 test to see if the IP layer has been set to the load-sharing mode. If so, step 194 gives the current message the source IP address of the MATCHING_INTERFACE_ARRAY entry whose corresponding ACTIVE_INTERFACE_ARRAY entry has the lowest total count summed over all N SECONDS_TRAFFIC_COUNT entries in its SHORT_TERM_TRAFFIC_ARRAY. The load-sharing distribution mode has the advantage of normally doing a better job of evenly distributing traffic between alternate possible routes than does the round-robin scheme. This leads to a greater overall communications bandwidth over those routes.

If neither of the tests of steps 190 or 192 is met, step 196 tests to see if the IP layer is in the service-sharing mode. If so steps 197, 198 and 200 are performed.

Step 197 gives the current message the source IP address of the MATCHING_INTERFACE_ARRAY entry whose corresponding ACTIVE_INTERFACE_ARRAY entry has the lowest WEIGHTED_SERVICES_TOTAL. As stated above, the WEIGHTED_SERVICES_TOTAL is a weighted sum of the number of sockets which have been associated with an active interface, weighted by the amount of traffic normally associated with the type of cummunication service being performed by each such socket.

Once step 197 selects the current message's source IP address, step 198 reads the current message's destination port number and step 200 adds the communication weight associated with that destination port number to lowest WEIGHTED_SERVICES_TOTAL selected in step 197. This is done to reflect the fact that the current message's socket has now been associated with the network interface for which that WEIGHTED_SERVICES_TOTAL is being calculated. The communication weights associated with individual destination port numbers are stored in a service demand table 234 shown in FIG. 13.

In TCP/IP many port numbers under 256 are associated with well known TCP/IP services, such as FTP, telent, or DNS. FTP, or file transfer protocol, for example, tends to be a very communications intensive service, since it involves the transfer of whole files. Thus, FTP has a high weight for purposes of the WEIGHTED_SERVICES_TOTAL. HTTP, which is used to access text, graphics, and other objects by web browsers, also has a high service weight. DNS, or domain name service, tends to involve very brief communications, and thus it is given a very low weight. Services which are not known to the IP layer are given an intermediate weight. In the end system 50BB the weights in the service demand table associated with different service port numbers have been set based on a statistical study of the service demands associated with sockets having such destination port numbers. In other embodiments of the invention, such statistics could be computed in an on-going manner for the given end system involved to make them more accurately reflect the usage of the particular end system involved.

Regardless of which distribution mode has been used to allocate a source IP address to the current message in steps 190–200, once such a source IP address has been allocated to the current message, step 202 creates an entry for the message's socket in the ACTIVE_SOCKET_ARRAY shown in FIG. 15. This is done because steps 190–200 only allocate source IP addresses to messages which do not already have entries in the ACTIVE_SOCKET_ARRAY. The new entry created in step 202 records the source port, source address, destination port, and destination address of the current message, which define the message's socket.

Regardless of whether the current message had a previously created socket entry in the ACTIVE_SOCKET_ARRAY, or whether steps 156–202 have just created such a socket entry for that message, once the current message has such a socket entry, step 208 places an IP header on the current message containing the source and destination IP addresses from the message's corresponding socket entry.

Once this is done, step 209 adds the length of the message, in bits, to the current SECONDS_TRAFFIC_COUNT of the SHORT_TERM_TRAFFIC_ARRAY of the ACTIVE_INTERFACE_ARRAY entry having the current message's socket. The bit length of all outgoing and incoming messages within the current second are added to this count, so as to provide a measure of short- and mid-term traffic for use by the message distribution scheme and auto-connect scheme of the modified IP layer 90B.

After this, step 210 updates the LAST_USED_TIME in the current message's corresponding socket entry in the ACTIVE_SOCKET_ARRAY, so the system will know the socket has recently been used and should not be removed from the array.

Then step 212 directs the current message out the network interface 146 shown in FIG. 13 which has the current message's source IP address. This delivers the message to that network interface's corresponding network interface physical layer. Once this is done, step 214 returns from OUTGOING_MSG_PROCESS, ending the IP layer's handling of the current message. Once the message has been sent out through a network interface 146, the corresponding network interface physical layer instance, such as the layer instancs 92B or 92C in FIG. 13, and its corresponding network hardware will send the message out over the network.

FIG. 18 illustrates INBOUND_MSG_PROCESS 152, a highly simplified description of the functions of the IP layer code which process incoming messages received by the IP layer 90B from a lower network interface physical layer.

When an incoming message is received, INBOUND_MSG_PROCESS is called. Its first step 240 tests to see if the combination of source port, source address, destination port, and destination address defined in the messages IP and TCP headers corresponds, respectively, to destination port, destination address, source port, and source address of any entry in the ACTIVE_SOCKET_ARRAY. If no such matching entry is found, step 240 creates one.

Then, regardless of whether the current message's socket entry was just created or not, step 242 updates the LAST_USED_TIME of that entry, so the system will know the socket has been recently active. Then step 244 adds the current message's bit length to the current SECONDS_TRAFFIC_COUNT in the entry in the ACTIVE_INTERFACE_ARRAY having the same IP address as the messages destination address. This is done so the IP layer can keep track of how busy each of its network interfaces is. Then step 246 strips the current message of its IP header and sends it up to the TCP layer, after which step 248 returns, ending the IP layer's handling of that message.

FIG. 19 illustrates UPDATE_DEAMON 250, a highly simplified description of a sub-routine which is called approximately once every second to remove inactive socket entries from the ACTIVE_SOCKET_ARRAY and to update the traffic counts associated with each active physical interface.

The first step of UPDATE_DEAMON, step 251, causes a step 252 to be performed for each socket entry in the ACTIVE_SOCKET_ARRAY. Step 252 test to see if the time which has elapsed since the LAST_USED_TIME for each socket entry is longer that a SOCKET_TIME_OUT_PERIOD. If so, it causes steps 253 and 254 to be performed for the inactive socket entry. Step 253 removes the socket entry from the ACTIVE_SOCKET_ARRAY because the socket has been inactive so long that it is virtually certain the socket is no longer in use by the TCP layer. Step 254 subtracts the weight from the WEIGHTED_SERVICE_TOTAL in the ACTIVE_INTERFACE_ARRAY corresponding to the inactive socket's source IP address. This is done to reflect the fact that the communications demand associated with the socket being deleted is no longer associated with the interface.

Once the loop of step 251 has been performed for each socket entry in the ACTIVE_SOCKET_ARRAY, step 256 performs a loop, comprised of steps 258, 260, and 262 for each entry in the ACTIVE_INTERFACE_ARRAY.

Step 258 increments the SECONDS_TRAFFIC_COUNT pointer within the circular SHORT_TERM_TRAFFIC_ARRAY of the current active interface loop 256. This pointer determines which of the N SECONDS_TRAFFIC_COUNT entries in the SHORT_TERM_TRAFFIC_ARRAY is the current one, that is, the one to be used to count the traffic for the current second. The pointer is a circular pointer, meaning that incrementing the pointer causes it to address the first entry of the SECONDS_

TRAFFIC_COUNT after addressing the last, so that successive increments to the pointer cause it to repeatedly cycle through the array's entries.

Next step 260 tests to see if the pointer incremented by step 258 points to the first SECONDS_TRAFFIC_COUNT entry in the SHORT_TERM_TRAFFIC_ARRAY. If so, the period of N seconds associated with each entry in the MID_TERM_TRAFFIC_ARRAY has just been completed and steps 262 and 264 are performed. Step 262 increments the ST_PERIOD_TRAFFIC_COUNT pointer within the current interface's corresponding circular MID_TERM_TRAFFIC_ARRAY. Then step 264 sets the ST_PERIOD_TRAFFIC_COUNT currently pointed to by the just incremented pointer to the total of all N of the SECONDS_TRAFFIC_COUNT entries within the current interface's corresponding SHORT_TERM_TRAFFIC_ARRAY.

Step 268 is the final step of the loop 256. It clears the current SECONDS_TRAFFIC_COUNT of the current interface so that it can start to record the bit traffic though the current interface in the just starting period of one second.

Once the loop 256 has be performed for all of the entries in the ACTIVE_INTERFACE_ARRAY, step 268 returns from the UPDATE_DEAMON.

FIG. 20 illustrates AUTOCONNECT_DEAMON 270, a highly simplified description of a sub-routine which is called approximately once a minute by the modified IP layer 90B if the user has selected to have the end system automatically connect or disconnect network connections in response to changes in traffic rates.

AUTOCONNECT_DEAMON consists of a loop 272 which is performed for each of the zero or more groups of auto-connect physical interfaces which may exist on a given end system.

The IP layer knows about such groups by information stored in a physical interface table 273 shown in FIG. 13. This table contains information which the user or system administrator has entered, or which have been entered mechanically by means of automatic hardware recognition protocols such as Microsoft Window's Plug & Play. In the example of end system 50BB, there is only one group of auto-connect physical interfaces, that comprised of the two dial-up modems 54 shown in FIG. 13. In other end system there might be more than two dial-up modems, or there might be other types of auto-connect network interfaces besides modems.

The loop 272 which the AUTOCONNECT_DEAMON performs for each of zero or more auto-connect groups consists of two parts: step 274–280, which determine if another physical interface in the group should be connected, and steps 282–288, which determine if a currently connected physical interface in the group should be disconnected.

Step 274 tests if the group has any inactive physical interfaces. If so, step 276 test to see if the sum of all entries in all the MID_TERM_TRAFFIC_ARRAY's of the group's entries in the ACTIVE_INTERFACE_ARRAY is more that a HIGH_THRESHOLD for the group. If so, the physical interfaces in the group have been quite busy for several minute, and, thus, step 278 creates a new instance of physical layer software for one of the unused physical interfaces in the group, and step 280 calls an automatic log-on function associated with network interface physical layer of that unused physical interface, which causes the device to become active and connect to the network.

FIG. 21 illustrates AUTO_LOGON 292, a highly simplified description of the automatic log-on function which is standard in many PPP layers.

In a step 294 the log-on function dials a specified number which has usually been previously specified by the user. Then a step 296 performs PPP handshaking once step 294 has made its connection. This handshaking includes getting the IP address of the other side of connection and the IP address dynamically assigned to the end system's own network interface associated with the connection being formed. Once this is done, a step 298 logs on to the Internet provider whose router 52A is being connected to. This usually involves the indication of an account name and the transmission of a password. Then a step 300 calls the IP function route_add to add a default entry 134 into the IP layer's routing table which has as a gateway field the IP address of the Internet provider router which has been connected to. Then a step 302 calls route_add again, this time to add a static entry 132 to the routing table having as a destination field the IP address of the Internet provider router, and as a gateway field the IP address dynamically assigned by PPP to the end system's physical device which has just been connected. Once step 302 is complete, the automatic log-on function returns in step 304.

Returning now to the AUTOCONNECT_DEAMON of FIG. 20, if the current group of auto-connect physical devices for which the loop 272 is being performed has more than one auto-connect physical interface active in the group, a step 284 is performed. It tests to see if the sum of all entries in all the MID_TERM_TRAFFIC_ARRAYs of the group's corresponding entries in the ACTIVE_INTERFACE_ARRAY is less that a LOW_THRESHOLD for the group. If so, steps 286 and 288 are performed.

Step 286 determines which of the group's corresponding entries in the ACTIVE_INTERFACE_ARRAY has the lowest sum of entries in its M_TERM_TRAFFIC_ARRAY. It then removes from the routing table the entries which correspond to the corresponding physical interface. This will prevent the IP layer's OUTGOING_MSG_PROCESS from associating any more sockets with the group's most inactive physical interface. It will not, however, prevent messages, associated with previously created sockets which designate that physical interface's associated IP address, from being sent through that physical interface.

Step 288 test to see if there is any entry in the ACTIVE_INTERFACE_ARRAY which has no corresponding sockets in the ACTIVE_SOCKET_ARRAY. If so, it calls an automatic log-off sub-routine in the network interface physical layer for that entry's associated physical interface.

FIG. 22 illustrates AUTO_LOGOFF 306, a highly simplified description of the automatic log-off function which is standard in many PPP layers. In a step 308 this sub-routine automatically logs off from the Internet provider router it is connected to, step 310 disconnects the line, and step 314 returns, ending the AUTO_LOGOFF function.

Returning to the AUTOCONNECT_DEAMON of FIG. 20, it can be seen that steps 284–288 cause one of a group of auto-connectable physical network interface to become disconnected if the amount of traffic over the group is below a given threshold. Step 286 prevents any new sockets from being associated with the interface, and once all the sockets previously associated with the interface have been removed from the ACTIVE_SOCKET_ARRAY by the UPDATE_DEAMON for lack of recent use, the physical interface will be disconnected by step 288.

Once the loop of step 272 has been completed for all of the zero or more groups of auto-connect interfaces which the end system has, step 290 returns, ending the current call to AUTOCONNECT_DEAMON.

FIG. 23 is a very simplified representation of LOAD_TEST 316, an application level program designed to use the present invention to test the capability of other nodes on an inter-network to handle a given amount of traffic.

Step 318 of the program queries the user for the identification of a network end system to be tested, the name of an FTP file on that end system to be downloaded for the test, and the number of simultaneous downloads to be performed.

LOADTEST can be run on the end system 50BB shown in FIG. 13, but normally it is run on end systems specially designed for load testing. These special systems can have the same protocol stack as end system 50BB, but they normally have a much larger number of modems and corresponding network interfaces. The number of simultaneous transfers is normally picked to be equal to or less than the number of modems, since a single FTP process can use all the bandwidth of an individual modem line, and, thus, having more than one FTP process per modem line will not further increase the load on the remote end system being tested.

Once step 318 of LOAD_TEST has obtained the necessary information from the user, step 320 sets the IP layer to the round-robin mode discussed above with regard to steps 190 and 191 of FIG. 14. Then step 321 turns off the IP layer's auto-connect function, preventing the AUTOCONNECT_DEAMON from being called, so that the number of the end system's modem which are connected to the network will remain constant during the test.

Then step 322 creates a PPP layer instance, and calls AUTO_LOGON, for all of the testing system's modems, up to the number of FTP downloads selected by the user in step 318. This will create a static entry 132 and a default entry 134, similar to the entries 132B and 134B of FIG. 10, in the load tester's IP layer's routing table for each connected modem.

Once this is done step 322 requests the TCP layer to open a socket for each of the requested number of FTP transfers and generates an FTP request for the named file through each of them. The outgoing message associated with each such FTP request will normally be associated with default entries in the tester's routing table. Since the IP layer has been set to round-robin mode, and since the source ports of successive FTP requests will normally be numbered successively, the step 191 in the call to OUTGOING_MSG_PROCESS for successive outgoing FTP requests will normally allocate the sockets associated with each such successive FTP request to a different one of the tester's connected modems. If there are more FTP requests than connected modems, the additional successive FTP request socket are allocated to the connected modem in a cyclical fashion.

In response to step 322, the end system being targeted for the test will receive a plurality of FTP requests. Each of these will have the IP source, or return, address associated with the modem on the tester over which it was originally transmitted to the network. The targeted end system will normally respond by downloading a separate copy of the requested file for each such FTP requests, with each such download being address to the source IP address contained in its associated original FTP request. As a result, the testing system will receive the data associated with each such FTP request over the individual modem which initiated it.

A step 328 will then create a report to the user indicated the data rate on each of the modem lines and the combined data rate on all such lines, based on information stored in the MD_TERM_TRAFFIC_ARRAY of each active modem's associated entry in the ACTIVE_INTERFACE_ARRAY. Once this has been done, the test is complete and step 330 returns.

This description of the LOAD_TEST program is highly simplified. For example, most actual load testing programs would include many other features, such as the ability to perform tests using other types of data transfers besides FTP. The key concept, for proposes of this patent application, is that the invention enables one computer, using one protocol stack, to transmit and receive a large amount of network traffic to any one or more desired nodes on the network for the purpose of testing how it responds to such traffic.

Figure 24:
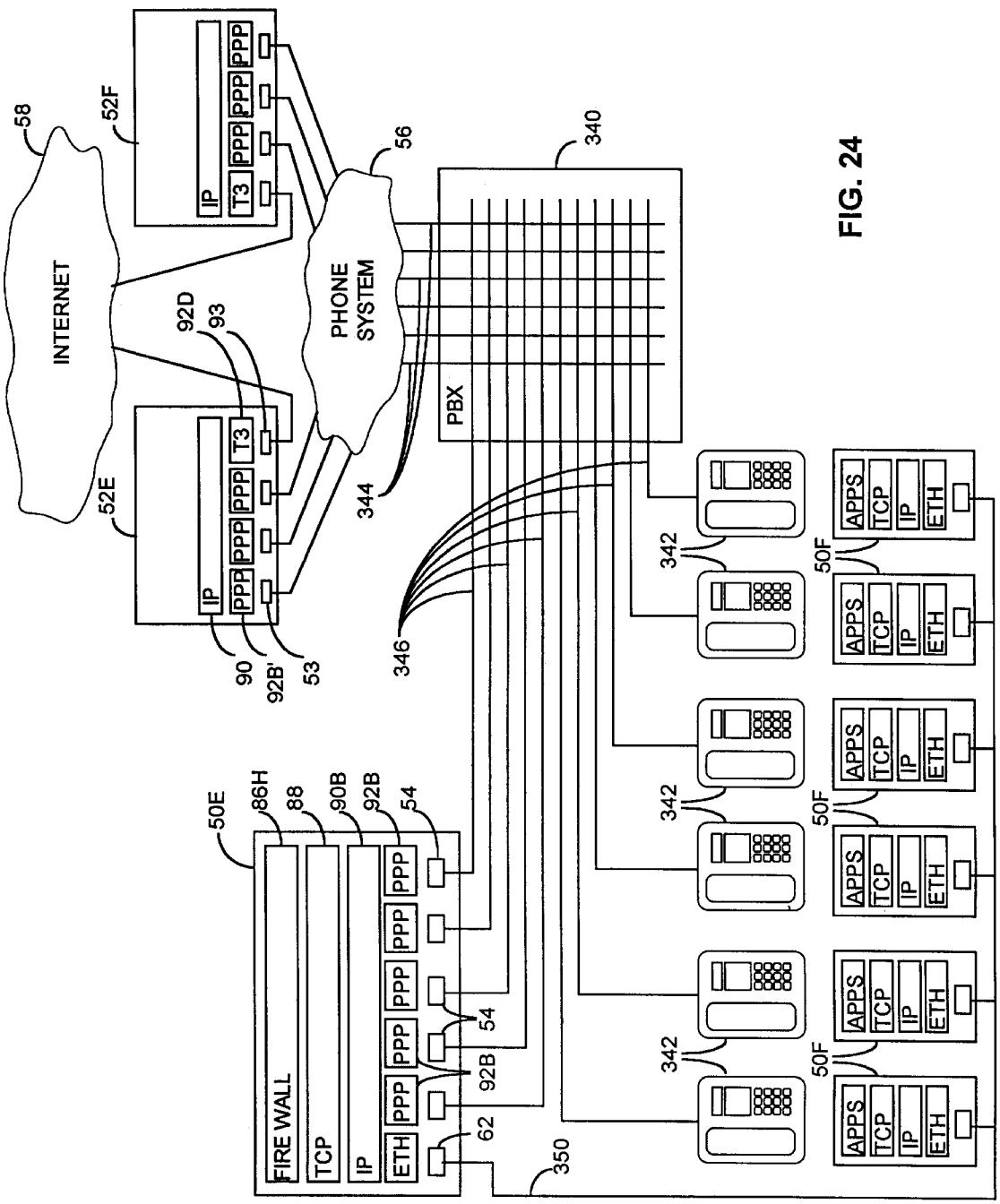
FIG. 24 is a schematic representation of an embodiment of the invention in which an end system operates as an Internet firewall and uses a private branch exchange to make multiple dial-up connections to an inter-network between which it can distribute traffic to the inter-network.

FIGS. 24 and 25 are used to describe an alternate embodiment of the invention which is designed to be used on a small business with a PBX, or private branch exchange, 340.

As is well known in the art of telephony, a PBX 340 is a type of telephone switch used by organizations to provide telephone communications, usually within a given building. The PBX is connected over inside phone lines 346 to a plurality of telephones 342. It is connected over a plurality of outside phone lines 344 to the outside telephone network 56. In other embodiments the PBX is connected to the external telephone system though a single relatively high speed communication link, such as a T1 leased line. The PBX allows call between telephones on its inside lines without the need to use outside lines 344. It also connects calls between inside and outside lines. Usually the number of outside lines connected to the PBX is less than the number of inside lines, reducing the number of outside lines that have to be paid for. This normally works well because usually only a small percent of the inside lines are calling outside the system at any one time.

In FIG. 24 a computer network end system 50E is shown which contains a TCP/IP protocol stack similar to that in the end system 50BB of FIG. 13. The end system 50E is running a firewall program in its application layer 86H. As is well known in the networking arts, a firewall is an application program which acts as a barrier, or "firewall" to protect a business's inside network from hackers, competitors, spies, saboteurs, or accidents which can damage it from the Internet.

The firewall system 50E in FIG. 24 has an "inside" connection to an ethernet lan 350, which includes a plurality of end systems 50F. It also has a plurality of potential "outside" connections. These potential outside connections correspond to a plurality of PPP dial-up modems 54 which are connected to inside lines 54 of the PBX. The PPP layer automatic log-on functions associated with each of these modems have been programmed to log on to Internet provider routers, such as the routers 52E and 52F shown in FIG. 24, through the PBX.

The firewall system 50E does not act as an IP level router. All data sent through it has to be contained in IP messages addressed to the firewall machine itself Normally if a user on one side of the firewall intends to address messages to a specific machine on the other side of the firewall, he or she has to first conduct a dialog with the firewall application telling it of the address on the other side to which messages associated with a given socket addressed to the firewall itself are to be sent.

All messages which arrive on one side of the firewall have to be passed all the way up the firewall machine's protocol stack to the firewall application level program. This program inspects each message and sees if it is of the type which it has been programmed, or informed by the system administer, to pass over the firewall's inside/outside barrier. If so, it can generate a corresponding new message addressed to a destination address on the other side of the firewall to which it has been programmed to, or which a previous dialog has told it to, send such an approved type of message.

The IP layer 90B of the firewall system 50E is the same as that of the end system 50BB discussed above with regard to FIGS. 14–19. It can be run in the auto-connect mode with each of its modems being listed in an auto-connect group in the layer's physical interface table 273. This will cause the AUTOCONNECT_DEAMON of FIG. 20 to automatically connect or disconnect modem connections to the Internet as a function of the amount of traffic to the Internet which passes through the firewall machine. Since the PPP layer instance 92B associated with each modem will place a static entry 132 and a default 134 in the firewall machine's IP routing table, the IP layer 90B will distribute messages traveling through the firewall between all of the currently connected modems, increasing the effective bandwidth of the firewall connection between the LAN 350 and the Internet 58.

As is well known in the art, most PBX's are programmable devices. In the embodiment of FIG. 24 the PBX 340's program code has been written to give it the option of enabling outgoing voice calls to have a preference over additional modem connections.

In FIG. 25 the portion of the PBX_CODE 352 which gives this preference is represented in a highly simplified manner by steps 354, 356, 358, and 360. Step 354 tests to see if there is a new voice call attempting to go out through the PBX. If so, step 356 tests to see if there is an outside line available for the call. If not, step 358 tests to see if the PBX has been set to a mode in which it automatically disconnects modem lines if needed to make room for an outgoing voice call. If so, step 358 tests to see if the number of outside lines being used by the firewall's modems is above a threshold number MIN_MODEM_LINES. If so, step 360 disconnects one of the modem lines to make room for the outgoing call.

Setting the PBX to the automatic disconnect mode only makes sense if the organization using the system of FIG. 24 values the ability to make additional outgoing voice calls much more important that the performance of its data communications to the Internet. When step 360 of the PBX_CODE disconnects a modem line, both the firewall system 50E and the remote Internet provider router to which the line was connected will be able to recover gracefully, but it will take some time to do so. The TCP layer of the firewall system 50E will notice that all the messages associated with the disconnected line have received time-out messages. In reponse, it will then re-send those messages and recreate their associated sockets using one or more of the firewall system's modems which continue to operate. But this process can take minutes.

In the embodiment of FIG. 24, it is preferred that the PBX keeps a traffic count on modem lines and disconnects the most inactive of those lines in step 358, to minimize the impact of such disconnections. In other embodiments of the invention in which a computer network node connects and disconnects dial-up connections through a PBX, the computer network node has a communication link with, or is part of the same machine as, the PBX. This enables the computer network node to know that such a disconnect has occurred as soon as it happens, allowing the node to immediately re-send any messages which have been negatively impacted by the disconnect.

It can be seen from the above discussion of FIGS. 8–25 that the present invention provides means for computer network end systems and routers to increase their bandwidth with a computer network. It can do this without requiring any change in the rest of the network to which systems using it are connected. For example the TCP/IP embodiments of the invention described above can operate on the Internet without requiring any change in the TCP/IP routers and end systems through which, and to which, they communicate.

It should be understood that the foregoing description and drawings are given merely to explain and illustrate the invention and that the invention is not limited thereto, except insofar as the interpretation of the appended claims are so limited. Those skilled in the art who have the disclosure before them will be able to make modifications and variations therein without departing from the scope of the invention.

For example, the functions described in the claims below, like virtually all computer functions, can be performed by many different programming and data structures, and by using different organization and sequencing. This is because programming is an extremely flexible art form in which a given idea of any complexity, once understood by those skilled in the art, can be manifested in a virtually unlimited number of ways.

Furthermore, it should be understood that the invention of the present application, as broadly claimed, is not limited to use with any one type of operating system, computer, network protocol stack, physical layer, or computer hardware. For example, many of the functions which are shown being performed in software in the specification could be performed in hardware in other embodiments.

It should be understood that the invention is not limited to use with dial-up modems or ethernet connections. It can be used with many different types of network communication links, including ISDN, T1, T3, or SONET connections. For example, the end system 50CC in FIG. 8 is shown with two T3 line 370 to two somewhat distant, in terms of network topology, locations on the Internet. This allows the system 50CC to have virtually twice the bandwidth as if it were connect through only one T3 line to the Internet. Not only does it have a higher bandwidth to the Internet, but since it is connected to the Internet through routers which are somewhat distant from each other, its total bandwidth to the Internet will be less impacted by communication bottlenecks in portions of the Internet near any one of those individual routers.

It should be understood that TCP/IP stacks normally include both UDP and TCP in their transport layer, and that the invention can be made to work with UDP as well as TCP. Furthermore, those skilled in the network programming field will understand that many aspects of the invention can be used with other types of network protocols besides TCP/IP, such as, for example, X25.

Similarly, the mere fact that the specification discusses the use of the invention to speed the connection of network nodes to the Internet service providers does not mean that the invention cannot be used to speed connection to other types of network service providers. For example, the invention can be used to provide increased bandwidth to on-line service providers. This is particularly true since the major on-line service providers are switching to the use of the TCP/IP protocol in conjunction with the PPP network interface physical layer.

It should also be understood that the invention can use many other methods for distributing messages between network interfaces than those shown in the specification. For example, in the TCP/IP environment it is important to give all outgoing messages associated with the same socket the same source IP address, so as to not confuse standard TCP/IP machines being communicated with. But it is not actually necessary to send all or any of the messages associated with a given socket out through the network interface identified in the socket's source IP address. Thus, it would be possible to use a different algorithm for deciding which network interface to send a message out through than is used for deciding which source IP address it is given. Similarly, many different algorithms could be used for distributing messages or sockets between different network interfaces, besides the specific round-robin, load-sharing, or service-sharing modes described above with regard to steps 190–200 of FIG. 14. For example, in the TCP/IP environment, messages could be distributed between network interfaces based on the modulo of their destination port or even the modulo of their destination address, instead of based on the modulo of their source port. All of these functions would provide a rough approximation of a random distribution of such messages between different network interfaces.

It should also be understood that although most of the specification discusses application of the invention to end systems on a computer network, its has aspects which are applicable for use on network routers as well. For example, the router 52BB in FIG. 8 includes two T3 connections 372 to the Internet. Its IP layer 90C, although somewhat different than the IP layer 90B discussed above with regard to FIGS. 14–20, can also distribute messages between multiple defaults or multiple static entries with overlapping address ranges.

As stated above, routers do not normally route messages received from higher levels in the protocol stack. Instead they route messages which have been received by one of the router's network interfaces. Since the routers will be receiving messages from other systems which already include a source port, they will not select source ports for messages they route, as does the IP layer 90B described above.

Also, since most routers handle a large amount of traffic associated with a large number of different sockets, routers using the present invention will not normally keep any records of the sockets of the messages which they route, such the ACTIVE_SOCKET_ARRAY kept by the IP layer 90B. But there is no need for them to do in order to practice many aspects of the present invention. Routers can easily distribute the messages they are routing between defaults routing entries or static routing entries with the overlapping address ranges by using the round-robin method or load-sharing methods described above.

What we claim is:

1. A computerized method for use on a computer transmitting messages onto a computer network, each of which messages has been provided with a network-level destination address from a set of possible network addresses, each of which destination addresses identifies a machine which has a connection to the network at a remote location, said method comprising:

associating each of a plurality of network interfaces, each having a different network address, with said computer so as to make said computer a multihomed computer;

associating each of more than one of said network interfaces with a common portion of said address set; and assigning each message to be transmitted to a given network interface, including assigning different messages whose destination address falls within said common portion of said address set to different ones of said network interfaces associated with said common portion independently of the remote location of the machine identified by the destination address of each such message.

2. A computerized method as in claim 1 further including sending each message out onto the network through the network interface to which it has been assigned.

3. A computerized method as in claim 1:

wherein said computer is a network end system; and further including:
associating a network-level address with each network interface;
sending each message out onto the network with a network-level source address corresponding to the network-level address associated with the network interface to which it has been assigned.

4. A computerized method as in claim 3 wherein:

said network end system uses a TCP/IP protocol stack;

said address set is a set of possible IP addresses;

said network-level address associated with each interface is each such interface's IP address; and said messages are sent out on the network with the IP address of the network interface to which it has been assigned as the message's source IP address.

5. A computerized method as in claim 4 further including:

generating a socket for each communication process between a source port on the end system and a destination port on another remote system; and generating said messages in association with such sockets;

causing messages associated with a given socket to be assigned to the same network.

6. A computer system designed to function as a multi-homed end system on a computer network by transmitting messages out onto the network through network interfaces, said system comprising:

a network protocol stack, including a network layer;

a plurality of network interfaces each having a separate address at the network level of the protocol stack;

software for transmitting outgoing messages, each having a corresponding network layer destination address identifying a destination computer to which the message is addressed, each of which destination addresses identifies a machine which has a connection to the network at a remote location, wherein said destination addresses correspond to multi-digit numbers defined by a plurality of digits, ranging from high to low order digits; and logic in the protocol stack for automatically distributing outgoing messages between said plurality of network interfaces independently of one or more of the highest order digits of the destination addresses of the messages so distributed and independently of the remote location of the machine identified by the destination address of each such message.

7. A computer system as in claim 6 wherein the logic for distributing includes logic for distributing outgoing messages between said plurality of interfaces independently of the value of any of the network address digits in the destination addresses of the outgoing messages so distributed.

8. A computer system as in claim 6:

further including logic for directing outgoing messages which have a destination address falling within a given range of one or more continuous network addresses to said plurality of interfaces, wherein said range corresponds to a specific value for each of an integer number N of the one or more highest order network address digits; and wherein the logic for automatically distributing includes logic for distributing the outgoing messages directed to said plurality of interfaces between said plurality of interfaces independently of an integer number M of the one or more next highest order address digits after the N highest order address digits of the destination addresses of the outgoing messages so distributed.

9. A computer system as in claim 6:

further including:

a routing data structure for associating each of zero or more specific network address ranges, each representing one or more continuous network addresses, with a corresponding network interface of the computer system; and logic for directing outgoing messages whose destination address does not match any of the specific network address ranges associated with a network interface in said routing data structure to said logic for automatically distributing outgoing messages between said plurality of network interfaces; and wherein the logic for automatically distributing distributes such non-matching outgoing messages between said plurality of network interfaces.

10. A computer system as in claim 6 wherein:

said software for generating outgoing messages includes:

logic for establishing a plurality of two-way network connections, each for transferring messages in each direction between a given computational entity on the computer system and a given computational entity on another, external, computer connected to the network, each of said connections being defined in said computer system by a source computational entity identifier, a source network address, a destination computational entity identifier, and a destination network address; and logic for transmitting said outgoing messages with the source computational entity identifier, the destination computational entity identifier, and the destination network address; and said logic for automatically distributing distributes the outgoing messages between said plurality of network interfaces in such a manner that all the messages associated with a given connection, as defined by the source computational entity identifier, are given the same source network address.

11. A computer system as in claim 10 wherein said logic for automatically distributing includes:

logic for reading the destination computational entity identifiers of outgoing messages; and logic for determining which of said plurality of network interfaces a message having a given source computational entity should be allocated as a function of said reading of destination computational entity identifiers.

12. A computer system as in claim 11:

further including a data structure associating different levels of communications demands with different destination computational entity identifiers; and wherein said logic for automatically distributing distributes outgoing messages between network interfaces as a function of those levels of communication demand associated with destination computational entities.

13. A computer system as in claim 6:

further including logic for producing a measurement of the recent level of communication through each of said plurality of network interfaces; and wherein said logic for distributing distributes outgoing messages between said interfaces so as to increase the distribution of such outgoing messages to network interfaces with the lowest measurements of recent levels of communication.

14. A computer system as in claim 6 wherein:

said protocol stack is a TCP/IP protocol stack having a TCP transport layer and an IP network layer;

said software for transmitting outgoing messages is in said TCP layer and it transmits messages having a source port, a destination port, and a destination address;

said logic for distributing is in the IP layer; and said logic for distributing outgoing messages distributes outgoing message received from the TCP layer between network interfaces based on the source port identified in each such outgoing message in such a manner that all messages associated with a given source port will be assigned to the same network interface.

15. A computer system as in claim 14 wherein said logic for distributing distributes said outgoing message between N network interfaces based on the modulo of the source port numbers of such messages when divided by N.

16. A computer system as in claim 6:

wherein:

said protocol stack is a TCP/IP protocol stack having a TCP transport layer and an IP network layer;

said software for transmitting outgoing messages is in said TCP layer and it transmits messages having a source port, a destination port, and a destination address;

said logic for distributing is in the IP layer; and said logic for distributing makes such distribution as a function of the destination port identified in the outgoing message received from the TCP layer;

said TCP layer includes logic for establishing a plurality of two-way network connections, each for transferring messages in each direction between a given port on the computer system and a given port on another, external, computer connected to the network, each of said connections being defined in said computer system by a source port, a source IP address, a destination port, and a destination IP address; and said logic for distributing includes logic for associating a given source port with a given one of said plurality of network interfaces and for causing all outgoing messages having a given source port to have a source IP address corresponding to the IP address of the source port's associated network interface; and further including:

a data structure associating different levels of communications demand with different destination ports;

a data structure for keeping track of which source ports are associated with which network interfaces; and wherein said logic for automatically distributing distributes the association of source ports between the plurality of network interfaces as a function of the number of source ports which are associated with each such interface, weighted by the level of communication demand associated with the destination port associated with each such source port.

17. A computer system as in claim 6 wherein:

said protocol stack is a TCP/IP protocol stack, having a TCP transport layer and an IP network layer;

said software for transmitting outgoing messages is in said TCP layer and it transmits messages having a source port, a destination port, and a destination address;

said logic for distributing is in the IP layer;

said IP layer includes an IP routing table in which entries can be entered, each associating a given range of one or more continuous destination network addresses with a given network interface of the computer system; and for associating each of one or more default entries each with one or more of said network interfaces; and said logic for distributing includes logic for responding to a plurality of defaults entries in said IP routing table, each of which has an associated network interface, by distributing outgoing messages whose destination address does not match any of the destination address ranges in the IP routing table between the network interfaces associated with said plurality of default entries, so as to enable such non-matching messages to flow through the different network interfaces associated with the default entries at substantially the same time.

18. A computer system as in claim 17:

wherein each of said network interfaces associated with plurality of default entries have an associated physical interface connected to a modem; and further including logic for automatically causing said modems to make a connection over a communications link, to receive a dynamically allocated IP address from the other end of its connection, and to place that IP address in the IP routing table in association with a default entry.

19. A computer system as in claim 6 wherein:

said protocol stack is a TCP/IP protocol stack having a TCP transport layer and an IP network layer;

said software for transmitting outgoing messages is in said TCP layer and it transmits messages having a source port, a destination port, and a destination address;

said logic for distributing is in the IP layer;

said IP layer includes an IP routing table in which entries can be entered, each associating a given range of one or more continuous destination network addresses with a given network interface of the computer system; and said logic for distributing includes logic for responding to a given plurality of entries in said IP routing table which associate a common range of destination network addresses with different network interfaces, by distributing outgoing messages whose destination addresses match said common address range between the network interfaces associated with said given plurality of entries.

20. A computer system as in claim 6:

wherein each of said network interfaces can have a different level of communications traffic when communicating messages;

further including:
  logic for detecting the level of communications traffic on each of one or more of said active network interfaces;
  automatic connection apparatus for responding to a detection of a level of communications traffic on said active network interfaces which is above a certain level by automatically causing a connection to be made through a physical interface to a network and for creating a new active network interface in association with that network address, said automatic connection apparatus including a modem with an automatic dialer and automatic logon capability for automatically making said connection; and wherein said logic for distributing, distributes said outgoing messages among a plurality of network interfaces which includes said new active network interface.

21. A computer system as in claim 6:

further including load-testing software for causing said software for transmitting outgoing messages to transmit a plurality of load-testing messages with a common destination address; and wherein said logic for distributing distributes said outgoing load-testing messages addressed to the same destination address through different ones of said plurality of network interfaces.

22. A computer system designed to function as a multi-homed end system on a TCP/IP computer network by transmitting messages out onto computer networks through network interfaces, said system comprising:

a TCP/IP network protocol stack, having a TCP transport layer and an IP network layer;

a plurality of dial-up modems, each having elements for physically connecting to a dial-up communications line and each having a corresponding physical communication port to the computer system connection introduction elements:
  capable of causing each of said system's modems to make a dial-up connection to a separate modem which is not part of said system and which is connected to a TCP/IP network;
  for causing each of said system's connected modems to receive from the modem to which it is connected a dynamically allocated IP address; and
  for creating for each of said system's connected modem a corresponding network interface corresponding to the dynamically allocated IP address received by that modem;

software elements in the TCP layer for transmitting outgoing messages, each specifying a source port, a destination port, and a destination address; and elements in the protocol stack for automatically distributing said outgoing messages between said plurality of network interfaces so as to enable message to flow though said plurality of interfaces at substantially the same time, including elements for assigning different ones of said dynamically allocated IP address as source addresses for different ones of said outgoing messages.

23. A computer system as in claim 22:

further including:
  elements for detecting the traffic flow over those of said system's modems which are currently connected;
  elements for determining if all of said system's modems are currently connected; and
  elements responding to a detection that the traffic flow over said system's modems is above a certain level, and that not all of said system's modems are currently connected, by causing said connection introduction elements to cause one of said system's modems which is not currently connected to make one of said dial-up connections, to receive a dynamically allocated IP address, and to create a corresponding network IP address; and wherein said elements for distributing, distributes said outgoing messages between all of the network interfaces which have been created for the system's currently connected modems, including said modem connected in response to said detection of traffic flow.

24. A computer system as in claim 22 wherein said elements for distributing outgoing messages makes such distribution as a function of the source port specified in each such outgoing message in such a manner that all messages associated with a given source port will be assigned to the same network interface.

25. A computer system designed to function as a multi-homed end system on a computer network by transmitting messages out onto computer networks through network interfaces, said system comprising:

a network protocol stack, including a network layer;

a plurality of network interfaces each having a separate address at the network level of the protocol stack;

software elements for transmitting outgoing messages, each having a corresponding network destination address identifying a destination computer to which the message is addressed; and said network layer includes a routing table in which static routing entries can be entered, each associating a given range of one or more continuous destination network addresses with a given network interface of the computer system; and in which a plurality of static routing entries can be entered which have overlapping ranges of destination network addresses; and elements in the protocol stack for automatically distributing outgoing messages between said plurality of network interfaces, said elements including elements for responding to a plurality of static routing entries in said routing table which have overlapping ranges of destination network addresses by distributing outgoing messages whose destination address match the overlapping destination address ranges between the network interfaces associated with said plurality of overlapping static entries, so that messages can be traveling out through the network interfaces associated with said plurality of overlapping static entries at substantially the same time.

26. A computer system as in claim 25 wherein:

said network protocol stack includes elements for defining and associating transactional sockets with messages sent out on the network, each of which sockets is defined by a network level source address, a source port, a network level destination address, and a destination port; and said elements for automatically distributing outgoing messages includes elements for distributing outgoing messages associated with a given socket to the same network interface.

27. A computer system designed to function as a multi-homed end system on a computer network by transmitting messages out onto computer networks through network interfaces, said system comprising:

a network protocol stack, including a network layer;

a plurality of network interfaces each having a separate address at the network level of the protocol stack;

software elements for transmitting outgoing messages, each having a corresponding network destination address identifying the destination computer to which the message is addressed; and said network layer includes a routing table in which routing entries can be entered, each associating a given range of one or more continuous destination network addresses with a given network interface of the computer system; and in which a plurality of default entries can be entered, each associated with a different network interface with messages whose destination address does not match any of the given destination address ranges which may be in the table; and elements in the protocol stack for automatically distributing outgoing messages between said plurality of network interfaces, said elements including elements for responding to a plurality of default entries in said routing table by distributing outgoing messages whose destination address does not match any the destination address ranges in the routing table between the network interfaces associated with said plurality of default entries, so that messages can be traveling out through the network interfaces associated with said plurality of defaults at substantially the same time.

28. A computer system as in claim 27 wherein:

said network protocol stack includes elements for defining and associating transactional sockets with messages sent out on the network, each of which sockets is defined by a network level source address, a source port, a network level destination address, and a destination port; and said elements for automatically distributing outgoing messages includes elements for distributing outgoing messages associated with a given socket to the same network interface.

29. A computer system designed to function as a multi-homed end system on a computer network by transmitting messages out onto the network through network interfaces, said system comprising:

a network protocol stack, including a network layer;

a plurality of dial-up physical interfaces, each having elements for physically connecting to the network, and each of which can either be disconnected or connected to the network at any given time;

connection introduction elements for:

enabling each of said physical interfaces to make a connection to the network;

for creating for each such connected physical interface a corresponding active network interface corresponding with a corresponding network layer address;

software elements for transmitting outgoing messages, each specifying a destination network layer address; and elements for detecting the traffic flow over those of said physical interfaces which are currently connected;

elements for determining if all of said physical interfaces are currently connected;

elements responding to a detection that the traffic flow over said connected physical interfaces is above a certain level, and that not all of said physical interfaces are currently connected, by causing said connection introduction elements to cause another of said physical interfaces to make said connection and to create a corresponding active network interface; and elements in the protocol stack for automatically distributing said outgoing messages to a plurality of active network interfaces, including those associated with physical interfaces connected to the network in response to said detection of traffic flow, so as to enable message to flow though said plurality of interfaces at substantially the same time.

30. A computer system designed to transmit and receive messages on a computer network, said system comprising:

a computer including:

elements for storing an active socket memory structure containing a listing of one or more sockets which are currently active on said computer system, wherein:

each socket represents a connection for the bi-directional transmission of messages between a computational processes on said computer system and a computational process on a given remote node located on said network; and the socket listing for a given socket contains at least four socket fields including:

two port identifying fields, one identifying the socket's port on said computer system and one identifying the socket's port on said given remote node; and two network level address fields, a system network level address identifying one of a plurality of network level addresses associated with said computer system which represents the socket's associated network interface on said computer system and a remote network level address identifying the network level address of the socket's associated network interface on said given remote node;

elements for receiving messages to be transmitted by said computer onto the network, each of which messages is received with values for a plurality of socket fields corresponding to fields of said socket listings;

elements for detecting if the values of a set of one or more socket fields received with a given one of said messages match the values of a corresponding set of socket fields in any socket listing in the socket memory structure;

elements for responding to the detection of such a match by selecting the value of the matching socket listing's system network level address field and using it as a system network level address for the given message; and elements for causing said given message to be transmitted out onto said network with a network level header which includes two network level addresses, a network level source address and a network level destination address, and which includes said message's system network level address as one of said header's two network level addresses.

31. A computer system as in claim 30 wherein:

said computer has a plurality of network interfaces;

said elements for causing said given message to be transmitted out onto said network, includes elements for determining which of said computer's network interfaces a given message is sent out through as a function of the value of said message's system network level address.

32. A computer system as in claim 30 wherein:

said network level address field whose value is used as said message's system network level address is the matching socket listing's source network level address field; and said message's system network level address is used as the source network level address in the network level header with which the given message is sent out onto said network.

33. A computerized method for use on a computer system designed to transmit and receive messages on a computer network, said method comprising the steps of:

storing an active socket memory structure containing a listing of one or more sockets which are currently active on said computer system, wherein:

each socket represents a connection for the bi-directional transmission of messages between a computational processes on said computer system and a computational process on a given remote node located on said network; and the socket listing for a given socket contains at least four socket fields including:

two port identifying fields, one identifying the socket's port on said computer system and one identifying the socket's port on said given remote node; and two network level address fields, a system network level address identifying one of a plurality of network level addresses associated with said computer system which represents the socket's associated network interface on said computer system and a remote network level address identifying the network level address of the socket's associated network interface on said given remote node;

receiving messages to be transmitted by said computer onto the network, each of which messages is received with values for a plurality of socket fields corresponding to fields of said socket listings;

detecting if the values of a set of one or more socket fields received with a given one of said messages match the values of a corresponding set of socket fields in any socket listing in the socket memory structure;

responding to the detection of such a match by selecting the value of the matching socket listing's system network level address field and using it as a system network level address for the given message;

transmitting the given message out onto said network with a network level header which includes two network level addresses, a network level source address and a network level destination address, and which includes said message's system network level address as one of said header's two network level addresses.

34. A computerized method for use on a computer transmitting messages onto a TCP/IP computer network, each of which messages has been provided with a destination IP address out of a space of possible IP addresses, each of which destination addresses identifies a machine which has a connection to the network at a remote location, said method comprising:

associating each of a plurality of network interfaces, each having a different IP address, with said computer so as to make said computer a multihomed computer;

associating each of more than one of said network interfaces with a common region of said IP address space; and assigning each message to be transmitted by said computer to a given one of said network interfaces for transmission by that interface, including:

assigning different messages whose destination IP address falls within said common region of said IP address space to different ones of said network interfaces associated with said common region of said IP address space independently of the remote location of the machine identified by the destination address of each such message; and causing all messages associated with a given TCP/IP socket to be assigned to the same network interface.

35. A computerized method for use on a network router which routes messages on a TCP/IP computer network, each of which messages identifies a source IP address, a source port, a destination IP address, which identifies a machine which has a connection to the network at a remote location, and a destination port, said method comprising:

associating each of a plurality of network interfaces, each having a different IP address, with said router so as to make said router a multihomed computer;

associating each of more than one of said network interfaces with a common region of an IP address space; and assigning each message to be transmitted by said computer to a given one of said network interfaces for transmission by that interface, including assigning different messages whose destination IP address falls within said common region of said IP address space to different ones of said network interfaces associated with said common region of said IP address space independently of the remote location of the machine identified by the destination address of each such message and as a function of one of the ports identified by such message.

36. A computerized method as in claim 35 wherein said assigning of different messages to different network interfaces is performed as a function of the source port identified by such messages.

37. A computerized method for use on a given computer transmitting messages onto a computer network, each of which messages has been provided with a network-level destination address from a set of possible network addresses, each of which destination addresses identifies a computer which has a connection to the network at a remote location, said method comprising:

transmitting outgoing messages including:
establishing a plurality of two-way network connections, each for transferring messages in each direction between a given computational entity on the given computer and a given computational entity on another, external, computer connected to the network, each of said connections being defined in said computer by a source computational entity identifier, a source network address, a destination computational entity identifier, and a destination network address; and logic for transmitting said outgoing messages with the source computational entity identifier, the destination computational entity identifier, and the destination network address; and associating each of a plurality of network interfaces, each having a different network address, with said given computer so as to make said given computer a multihomed computer;

associating each of more than one of said network interfaces with a common portion of said address set; and assigning each transmitted message to a given network interface for transmission, including assigning different messages whose destination address falls within said common portion of said address set to different ones of said network interfaces associated with said common portion independently of the remote location of the computer identified by the destination address of each such message;

wherein said assigning of each message to a given network interface distributes the outgoing messages between said plurality of network interfaces in such a manner that all the messages associated with a given connection, as defined by source computational entity identifier, are assigned to the same network interface for transmission.

38. A computerized method for use on a computer transmitting messages onto a computer network, each of which messages has been provided with a network-level destination address from a set of possible network addresses, each of which destination addresses identifies a machine which has a connection to the network at a remote location and is defined by a plurality of network address digits, said method comprising:

associating each of a plurality of network interfaces, each having a different network address, with said computer so as to make said computer a multihomed computer;

associating each of more than one of said network interfaces with a common portion of said address set; and assigning each message to be transmitted to a given network interface, including assigning different messages whose destination address falls within said common portion of said address set to different ones of said network interfaces associated with said common portion independently of the remote location of the machine identified by the destination address of each such message;

wherein said assigning of each message to a given network interface distributes the outgoing messages between said plurality of network interfaces independently of the value of any of the address digits of the destination addresses of the outgoing messages so distributed.

39. A computerized method for use on a computer transmitting messages onto a computer network, each of which messages has been provided with a network-level destination address from a set of possible network addresses, each of which destination addresses identifies a machine which has a connection to the network at a remote location and is defined by a plurality of ordered network address digits, said method comprising:

associating each of a plurality of network interfaces, each having a different network address, with said computer so as to make said computer a multihomed computer;

associating each of more than one of said network interfaces with a common portion of said address set; and assigning each message to be transmitted to a given network interface, including assigning different messages whose destination address falls within said common portion of said address set to different ones of said network interfaces associated with said common portion independently of the remote location of the machine identified by the destination address of each such message, wherein:
said common portion of said address set includes a range of one or more continuous network addresses having a specific value for each of the N one or more highest order network address digits; and said assigning of each message to a given network interface distributes the outgoing messages between said plurality of network interfaces independently of one or more of the next highest order address digits after said N highest order address digits of the destination addresses of the outgoing messages so distributed.

40. A computerized method for use on a computer transmitting messages onto a computer network, each of which messages has been provided with a network-level destination address from a set of possible network addresses, each of which destination addresses identifies a machine which has a connection to the network at a remote location, said method comprising:

associating each of a plurality of network interfaces, each having a different network address, with said computer so as to make said computer a multihomed computer;

using a routing data structure to:
- associate each of one or more specified network address ranges, each representing one or more continuous network addresses, with a corresponding single one of said network interfaces; and
- associate network addresses which do not fall within any one of said specified network address ranges with a corresponding plurality of said network interfaces; and assigning each message to be transmitted to a given network interface for transmission by that interface, including:
- assigning each such message having a destination address falling within one of said specified network address ranges to the single network interface corresponding with that address range; and
- assigning each such messages whose destination address do not fall within any one of said specified network address ranges to one of said corresponding plurality of network interfaces, including assigning different ones of such messages to different ones of said corresponding plurality of network interfaces independently of the remote location of the machine identified by the destination address of each such message.

41. A computerized method for use on a computer transmitting messages onto a computer network using a TCP/IP protocol stack, each of which messages has been provided with a destination IP address from a set of possible IP addresses, each of which destination addresses identifies a machine which has a connection to the network at a remote location, and wherein at least some of said messages have a TCP socket number, said method comprising:

- associating each of a plurality of network interfaces, each having a different IP address, with said computer so as to make said computer a multihomed computer;
- associating each of more than one of said network interfaces with a common portion of said IP address set; and
- assigning each message to be transmitted to a given network interface, including assigning different messages whose destination IP address falls within said common portion of said IP address set to different ones of said network interfaces associated with said common portion independently of the remote location of the machine identified by the destination address of each such message;
- storing an association between the TCP socket number of a message and the network interfaces to which it has been assigned;
- wherein, said assigning of different messages to different network interfaces includes determining if an outgoing message has a TCP socket number associated with a given one of said network interfaces and responding to a determination that the message's socket number has such an association by causing said message to be assigned to the network interface associated with the message's socket number, so messages having the same socket will be assigned to the same network interface.

* * * * *